US012007704B2

(12) United States Patent
Usui et al.

(10) Patent No.: US 12,007,704 B2
(45) Date of Patent: Jun. 11, 2024

(54) IMAGE FORMING APPARATUS

(71) Applicant: CANON KABUSHIKI KAISHA, Tokyo (JP)

(72) Inventors: Masatake Usui, Shizuoka (JP); Hiroki Eguchi, Kanagawa (JP); Keisuke Mochizuki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/724,840

(22) Filed: Apr. 20, 2022

(65) Prior Publication Data

US 2022/0365458 A1 Nov. 17, 2022

(30) Foreign Application Priority Data

Apr. 26, 2021 (JP) ................................ 2021-074202
Apr. 26, 2021 (JP) ................................ 2021-074203

(51) Int. Cl.
*G03G 15/01* (2006.01)
*G03G 15/00* (2006.01)
*G03G 15/20* (2006.01)

(52) U.S. Cl.
CPC ..... *G03G 15/0173* (2013.01); *G03G 15/6573* (2013.01); *G03G 15/0131* (2013.01); *G03G 15/2039* (2013.01); *G03G 2215/0043* (2013.01); *G03G 2215/00805* (2013.01)

(58) Field of Classification Search
CPC ..... G03G 2215/00805; G03G 15/6585; G03G 15/2039; G03G 15/2064
See application file for complete search history.

(56) References Cited

U.S. PATENT DOCUMENTS 5,487,567 A * 1/1996 Volpe .................. B42D 25/324 283/67
8,248,661 B2 8/2012 Wang et al.
8,285,187 B2 10/2012 Kimura et al.
8,619,331 B2 * 12/2013 Qiao ................. G03G 15/6585 358/3.08
9,946,184 B2 * 4/2018 Yuasa ............... G03G 15/0178
(Continued)

FOREIGN PATENT DOCUMENTS

JP 2008199619 A 8/2008
JP 2011064956 A 3/2011
(Continued)

*Primary Examiner* — Jessica L Eley
(74) *Attorney, Agent, or Firm* — ROSSI, KIMMS & McDOWELL LLP

(57) ABSTRACT

An image forming apparatus includes an image forming unit configured to form a toner image on a recording material, a fixing unit configured to fix the toner image formed on the recording material by the image forming unit to the recording material, and a controller configured to cause the image forming unit to form an image on a basis of image information, the controller being configured to cause the image forming unit to form the image in which a first toner image and a second toner image is superimposed on each other on the recording material, the first toner image being a toner image corresponding to the image information, the second toner image being constituted by a pattern having anisotropy such that glossiness of the image changes depending on a direction in which the image is viewed.

23 Claims, 22 Drawing Sheets

(56) References Cited

U.S. PATENT DOCUMENTS

| | | | | |
|---|---|---|---|---|
| 10,009,503 | B1 * | 6/2018 | Chapman | H04N 1/32267 |
| 2012/0014702 | A1 * | 1/2012 | Takemura | G03G 15/2039 399/46 |
| 2012/0177426 | A1 * | 7/2012 | Fujita | G03G 15/6585 399/341 |
| 2014/0119798 | A1 | 5/2014 | Kimura | |

FOREIGN PATENT DOCUMENTS

| | | | |
|---|---|---|---|
| JP | 2013080250 | A | 5/2013 |
| JP | 2014092624 | A | 5/2014 |
| JP | 2016045272 | A | 4/2016 |

* cited by examiner

IMAGE FORMING APPARATUS

BACKGROUND OF THE INVENTION

Field of the Invention

The present invention relates to an image forming apparatus that forms an image on a recording material.

Description of the Related Art

An image forming apparatus of an electrophotographic system or an electrostatic recording system transfers a toner image formed on an image bearing member such as a photosensitive member or an intermediate transfer member onto a recording material, then performs a fixing process of the toner image by a fixing unit, and outputs the recording material as a product. In addition, an image forming apparatus capable of controlling the glossiness of an image output as a product is known. Japanese Patent Laid-Open No. 2013-80250 discloses performing a transfer process and a fixing process a plurality of times such that, in the case of forming an image including a plurality of image regions having different glossiness on a paper sheet, each image region passes through a fixing unit a different number of times.

Conventionally, there has not been known an image forming apparatus having a function of adding, to an image, a decorative effect in which the glossiness changes depending on the direction in which the image is viewed.

In addition, regarding a security image for forgery prevention of a printed product, there has been a demand for an image forming apparatus capable of forming an image from which exploiting information by reading by an image scanner or a camera is more difficult.

SUMMARY OF THE INVENTION

According to one aspect of the invention, an image forming apparatus includes an image forming unit configured to form a toner image on a recording material, a fixing unit configured to fix the toner image formed on the recording material by the image forming unit to the recording material, and a controller configured to cause the image forming unit to form an image on a basis of image information, the controller being configured to cause the image forming unit to form the image in which a first toner image and a second toner image is superimposed on each other on the recording material, the first toner image being a toner image corresponding to the image information, the second toner image being constituted by a pattern having anisotropy such that glossiness of the image changes depending on a direction in which the image is viewed.

According to another aspect of the invention, an image forming apparatus includes an image forming unit configured to form a toner image on a recording material, a fixing unit configured to fix the toner image formed on the recording material by the image forming unit to the recording material, and a controller configured to cause the image forming unit to form an image including a base image and a surface image formed on the base image, wherein the surface image includes a first halftone image and a second halftone image, wherein a first region where the first halftone image is formed and a second region where the second halftone image is formed are exclusive to each other and adjacent to each other, wherein the first halftone image is constituted by an anisotropic pattern such that difference between glossiness of the image in the first region and the glossiness of the image in the second region changes depending on a direction in which the image is viewed, and wherein difference between density of the image in the first region and the density of the image in the second region is equal to or smaller than a predetermined threshold value.

Further features of the present invention will become apparent from the following description of exemplary embodiments with reference to the attached drawings.

DESCRIPTION OF THE EMBODIMENTS

Embodiments according to the present disclosure will be described below with reference to drawings.

First Embodiment

Figure 1:
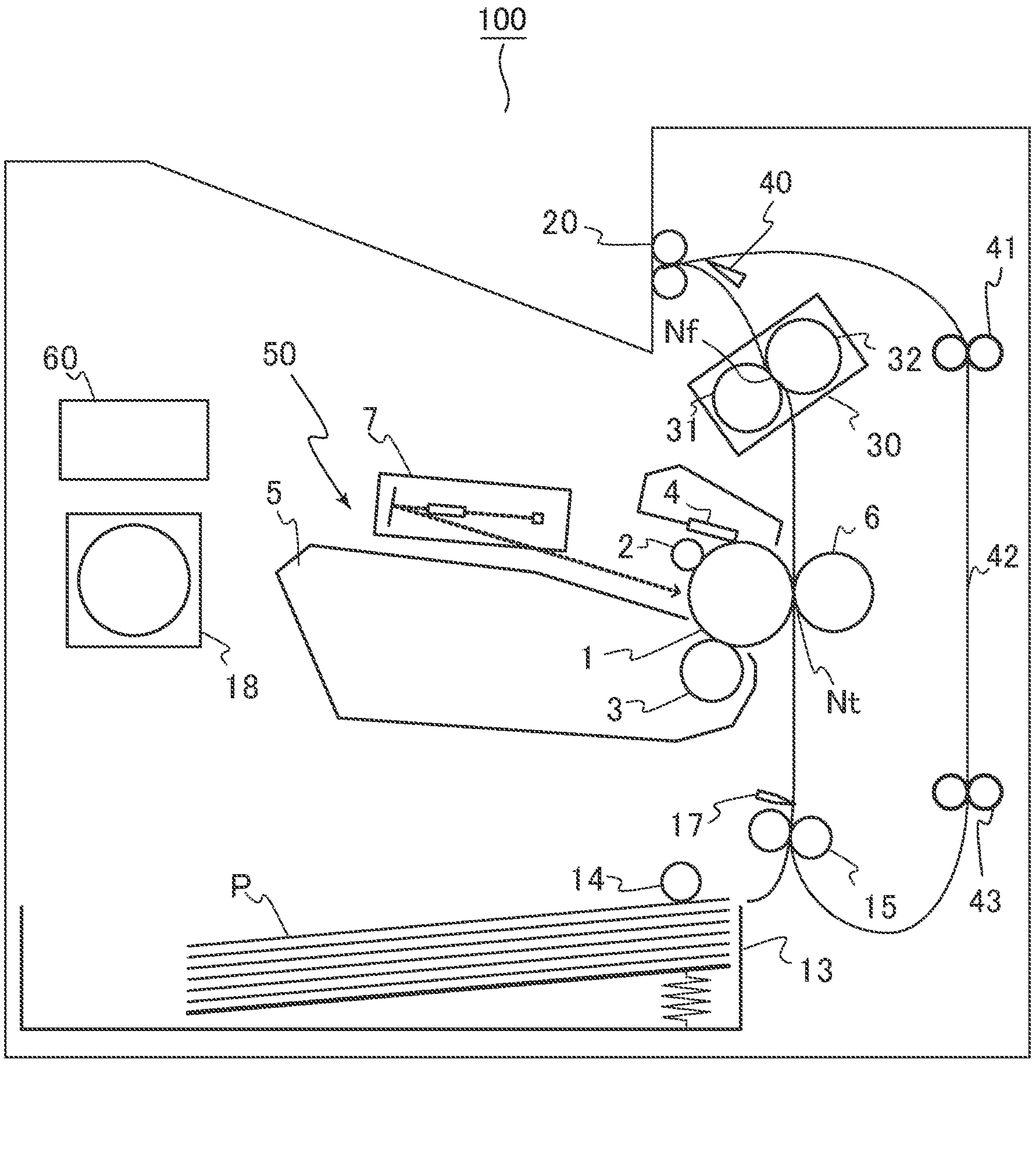
FIG. 1 is a schematic view of an image forming apparatus according to a first embodiment.

First, an overall configuration of an image forming apparatus according to a first embodiment will be described. FIG. 1 is a schematic diagram illustrating a sectional configuration of an image forming apparatus 100 according to the present embodiment. The image forming apparatus 100 is a monochromatic laser printer that forms an image on a recording material P by using an electrophotographic system. To be noted, as the recording material P, a wide variety of sheets of different sizes and materials can be used. Examples of the sheets include paper sheets such as plain paper sheets and cardboards, plastic films, cloths, surface-treated sheet materials such as coated paper sheets, and sheet materials of irregular shapes such as envelops and index paper sheets.

The image forming apparatus 100 includes an image forming portion 50 as an image forming unit that forms a toner image on the recording material P. The image forming portion 50 includes a process cartridge 5 and a transfer roller 6 serving as a transfer member. The process cartridge 5 includes a photosensitive drum 1 that is an electrophotographic photosensitive member serving as an image bearing member, a charging roller 2 serving as a charging unit, a developing roller 3 serving as a developing unit, and a cleaning blade 4 serving as a cleaning unit. In the present embodiment, the photosensitive drum 1, the charging roller 2, the developing unit including the developing roller 3, and the cleaning unit including the cleaning blade 4 are configured as the process cartridge 5 attachable to and detachable from an apparatus body of the image forming apparatus 100.

In addition, the image forming apparatus 100 includes a fixing unit 30 that fixes a toner image formed on the recording material P by the image forming unit to the recording material P. Further, the image forming apparatus 100 includes a feeding cassette 13, a feeding roller 14, a conveyance roller pair 15, a top sensor 17, the transfer roller 6, the fixing unit 30, a discharge roller pair 20, a motor 18, and a controller 60. The motor 18 is a drive source serving as a driving unit for supplying a driving force to the image bearing member and members that convey the recording material P. In the present embodiment, the single motor 18 covers the driving force of a plurality of members such as the feeding roller 14, the conveyance roller pair 15, the photosensitive drum 1, the fixing unit 30, and the discharge roller pair 20.

The photosensitive drum 1 is a photosensitive member formed in a drum shape, or a cylindrical shape, and is rotationally driven in a counterclockwise direction in FIG. 1 at a predetermined peripheral speed serving as a process speed during image formation. The charging roller 2 uniformly charges the circumferential surface of the photosensitive drum 1 to a predetermined polarity and potential. This will be referred to as primary charging. After the primary charging of the photosensitive drum 1, the charged surface is exposed to, or irradiated with, laser light emitted from an exposing unit 7 in a scanning manner. The exposing unit 7 outputs laser light that is on/off modulated in accordance with a video signal transmitted from the controller 60.

The video signal is generated on the basis of data obtained by spreading, in the main scanning direction and sub scanning direction of the exposing unit 7, image information of an image to be formed on the image bearing member, and indicates a signal to be transmitted to the exposing unit 7 as a signal designating the amount of toner for each pixel. This signal is a time-series digital pixel signal. In addition, the image information indicating the image to be formed on the recording material P is input from an image scanner connected to the image forming apparatus 100 or from an external device that is an information processing terminal such as a computer. By the exposure in a scanning manner by the exposing unit 7, electrical charges in an exposed region, or a light region, in the circumferential surface of the photosensitive drum 1 are removed, and an electrostatic latent image corresponding to the image information is formed on the circumferential surface of the photosensitive drum 1. The developing roller 3 bears developer containing toner on the surface thereof, and supplies toner to the photosensitive drum 1 to develop an electrostatic latent image formed on the circumferential surface of the photosensitive drum 1 into a toner image. In the present embodiment, a reversal development system in which toner is attached to the light region of the exposure for development is used.

The feeding cassette 13 is attachable to and detachable from the image forming apparatus 100, and accommodates a stack of recording materials P therein. The recording materials P in the feeding cassette 13 are fed one by one while being separated from each other as a result of the feeding roller 14 being driven on the basis of a feeding start signal from the controller 60, and are conveyed to the conveyance roller pair 15. The recording material P is further introduced into a transfer nip Nt serving as a transfer portion formed between the photosensitive drum 1 and the transfer roller 6 by the conveyance roller pair 15.

The top sensor 17 is disposed on a conveyance path between the conveyance roller pair 15 and the transfer nip Nt, and detects a timing at which the leading end of the recording material P delivered from the conveyance roller pair 15 passes the top sensor 17. The controller 60 adjusts the drawing start timing of the electrostatic latent image by the exposing unit 7 in accordance with the passage timing of the recording material P detected by the top sensor 17. That is, the drawing start timing is controlled such that the leading end portion of the toner image on the photosensitive drum 1 reaches the transfer nip Nt when the leading end portion of the recording material P reaches the transfer nip Nt.

The recording material P introduced into the transfer nip Nt is nipped and conveyed by the photosensitive drum 1 and the transfer roller 6 in the transfer nip Nt. During this, a transfer voltage controlled to a predetermined voltage value is applied to the transfer roller 6 from an unillustrated transfer voltage application power source. The transfer voltage of an opposite polarity to the normal charging polarity of the toner is applied to the transfer roller 6, and thus the toner image borne on the circumferential surface of the photosensitive drum 1 is electrostatically transferred onto the surface of the recording material P. The recording material P onto which the toner image has been transferred is conveyed to the fixing unit 30 from the transfer nip Nt. To be noted, transfer residual toner, paper dust, and the like on the circumferential surface of the photosensitive drum 1 having passed the transfer nip Nt are removed by the cleaning blade 4, and the circumferential surface of the photosensitive drum 1 is subjected to next image formation by going through the primary charging again.

The fixing unit 30 includes a fixing film 31 and a pressurizing roller 32, and nips and conveys the recording material P in a fixing nip Nf. The details of the fixing film 31 and the pressurizing roller 32 will be described later. During this, the toner image on the recording material P is heated by the fixing film 31 controlled to a predetermined fixing temperature, and is thus fixed to the recording material P. The recording material P having passed through the fixing unit 30 is discharged onto a discharge tray provided in an upper portion of the image forming apparatus 100 by the discharge roller pair 20 that discharges the recording material P, and is thus supported on the discharge tray. As a result of the series of operations described above, image formation on one recording material P is completed.

To be noted, in the case of duplex printing, the recording material P on a first surface of which an image has been formed by passing through the transfer nip Nt and the fixing nip Nf is delivered to the discharge roller pair 20, and is then pulled back into the image forming apparatus 100 as a result of the discharge roller pair 20 rotating in a reverse direction at a predetermined timing. The recording material P that has been pulled back is conveyed again to the image forming portion 50 in a state in which the first surface and a second surface thereof opposite to the first surface are swapped, by duplex conveyance roller pairs 41 and 43 provided in a duplex conveyance path 42. Then, the recording material P on the second surface of which an image has been formed by being conveyed through the transfer nip Nt and the fixing nip Nf from the conveyance roller pair 15 again is discharged onto the discharge tray by the discharge roller pair 20. That is, the duplex conveyance path 42 functions as a re-conveyance portion that conveys the recording material having passed through the image forming unit and the fixing unit again to the image forming unit or the fixing unit. In addition, in the present embodiment, the discharge roller pair 20 functions as an inversion unit that conveys the recording material to the re-conveyance portion in an inverted state.

By repeating the operation described above, image formation can be performed on a plurality of recording materials P one after another.

Fixing Unit

Figure 2:
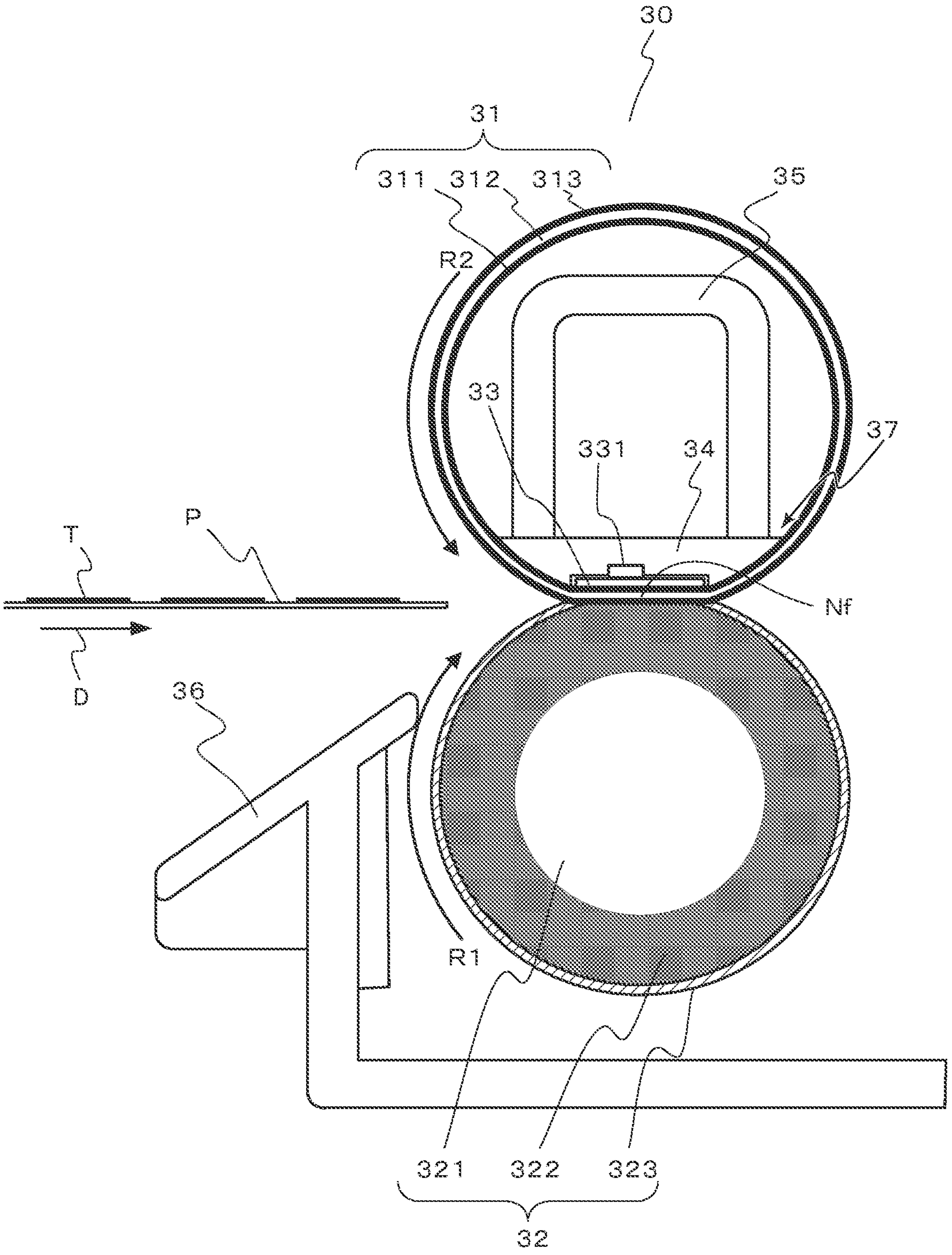
FIG. 2 is a schematic view of a fixing unit according to the first embodiment.

Next, a configuration of the fixing unit 30 included in the image forming apparatus 100 will be described. FIG. 2 is a schematic diagram illustrating a cross-section of the fixing unit 30 of the first embodiment along a plane perpendicular to the sheet width direction in the fixing nip Nf. The sheet width direction is the main scanning direction in the image formation, and is a rotation axis direction of the pressurizing roller 32. To be noted, for the sake of convenience of description, the fixing unit 30 illustrated in FIG. 2 is illustrated in a state in which the orientation of the fixing unit 30 in FIG. 1 is rotated by a predetermined angle.

The fixing unit 30 includes the fixing film 31, the pressurizing roller 32, a nip forming member 37 including a heater 33 and a heater holder 34, a pressurizing stay 35, and an entrance guide 36.

The fixing film 31 is a member formed in a tubular film shape, that is, an endless film shape, in which an elastic layer 312 and a surface layer 313 are formed on an outer circumferential surface of a base layer 311. The elastic layer 312 is formed from an elastic material having heat resistance such as silicone rubber from the viewpoint of improving the fixability and increasing the evenness of the glossiness. The surface layer 313 is formed from a material having high heat resistance and releasability such as fluorine resin from the viewpoint of improving the releasability with the recording material P and suppressing offset in which part of toner of a toner image T attaches to the surface layer 313.

The pressurizing roller 32 serving as a pressurizing member includes a core shaft portion 321, at least one elastic layer 322, and a surface layer 323. The elastic layer 322 is formed from an elastic material having heat resistance such as silicone rubber or fluorine rubber so as to secure the width of the fixing nip Nf that will be described later. The surface layer 323 is formed from a material having high heat resistance and releasability such as fluorine resin so as to suppress soiling with toner and paper dust. In the present embodiment, a roller having an outer diameter of 25 mm is employed as the pressurizing roller 32.

The heater 33 is a plate-shaped heat generating member that quickly heats the fixing film 31 while in contact with the inner circumferential surface of the fixing film 31. The heater 33 includes a heat generating resistor that generates heat when power is supplied thereto, and generates heat when a current is supplied thereto from a current circuit included in the image forming apparatus 100. The temperature of the heater 33 is detected by a thermistor 331 serving as a temperature detection unit that is in contact with the back surface of the substrate. Further, the controller 60 controls power supply to the heater 33 on the basis of a detection signal from the thermistor 331 such that the heater 33 is at a predetermined target temperature.

The heater holder 34 holds the heater 33. That is, the heater 33 and the heater holder 34 function as the nip forming member 37 that includes a heat generating member configured to heat the film and is disposed on the inner circumferential side of the film. The pressurizing stay 35 is constituted by a stiff member, and applies a pressurizing force received from an unillustrated pressurizing member such as a spring to the pressurizing roller 32 via the heater holder 34. As a result of this pressurizing force, a fixing nip Nf is formed as a nip portion of a predetermined width between the nip forming member 37 and the pressurizing roller 32 in pressure contact with each other with the fixing film 31 therebetween.

To be noted, although the heater 33 is in direct contact with the inner circumferential surface of the fixing film 31 in the fixing unit 30 of the present embodiment, a plate-shaped or sheet-shaped member having high thermal conductivity may be disposed between the heater 33 and the fixing film 31. Examples of this member include a sheet-shaped member formed from ferroalloy or aluminum. That is, a nip forming member 37 in which the heater 33 heats the fixing film 31 via a sliding member that slides on the inner circumferential surface of the fixing film 31 may be used.

Next, a fixing process of the fixing unit 30 will be described. The pressurizing roller 32 is rotationally driven in an arrow r1 direction by the motor 18 illustrated in FIG. 12 serving as a driving unit. Further, the fixing film 31 is rotated in an arrow r2 direction in accordance with the rotation of the pressurizing roller 32. The temperature of the heater 33 quickly rises in response to supply of power thereto, and the heater 33 heats the fixing film 31. In a state in which the heater 33 is controlled to a predetermined target temperature, the recording material P is guided to the fixing nip Nf along the entrance guide 36, and is nipped and conveyed in a conveyance direction D by the fixing film 31 and the pressurizing roller 32. In the conveyance process, toner on the recording material P is heated and pressurized, and thus an unfixed toner image T is fixed to the recording material P.

Control Block Diagram

Figure 3:
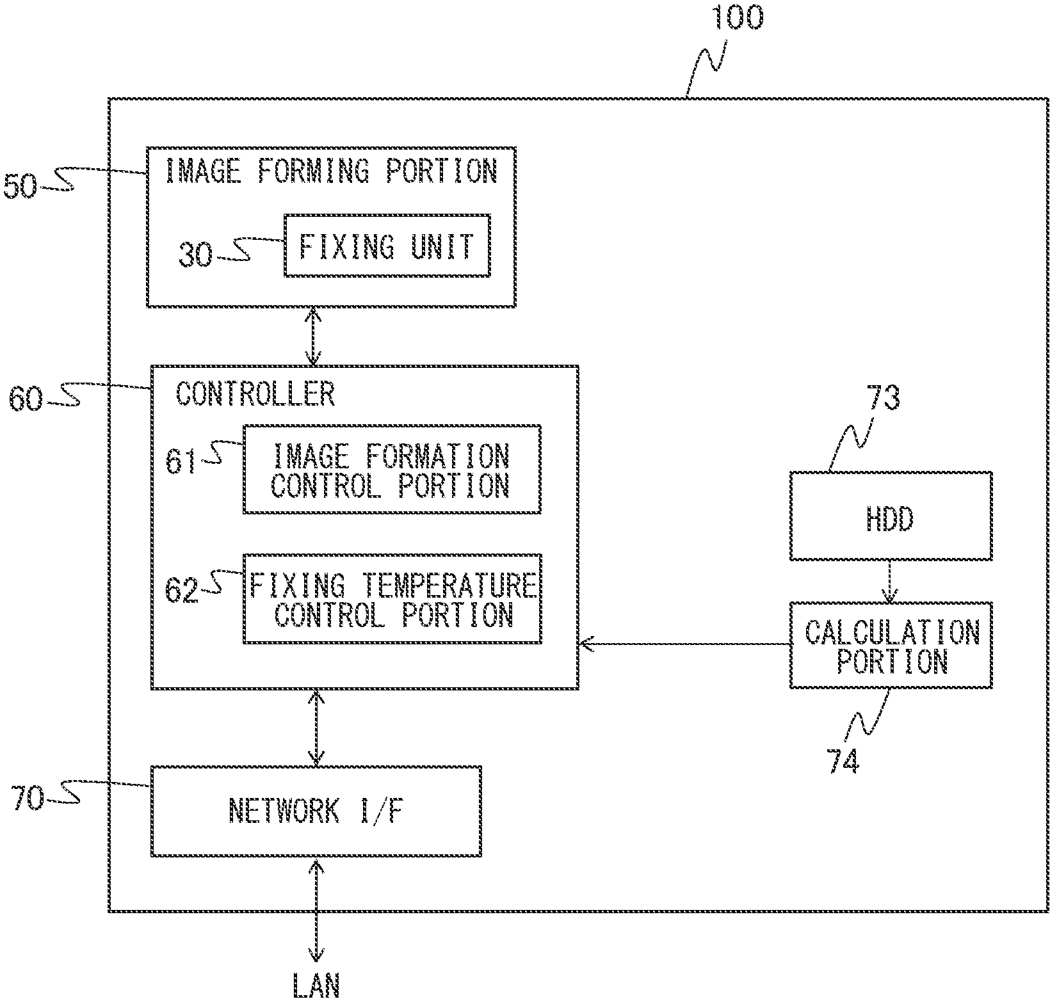
FIG. 3 is a block diagram illustrating a configuration of the image forming apparatus according to the first embodiment.

Next, a hardware configuration of the image forming apparatus 100 according to the first embodiment will be described with reference to a block diagram of FIG. 3. The image forming apparatus 100 includes the controller 60, the image forming portion 50, a hard disk drive: HDD 73, and a calculation portion 74.

The controller 60 is a control circuit including a central processing unit: CPU that executes a control program and performs overall control of the image forming apparatus 100, a random access memory: RAM serving as a work memory, and a read-only memory: ROM storing a control program. The ROM is an example of a non-transitory storage medium storing a control program of the image forming apparatus 100. The controller 60 includes an image formation control portion 61 for operating the image forming portion 50 on the basis of image information to execute an image forming operation. In addition, the controller 60 includes a fixing temperature control portion 62 that controls the temperature of the heater 33 of the fixing unit 30 to a predetermined temperature on the basis of a detection result of the thermistor 331 that is a temperature detection element.

The HDD 73 is a hard disk drive. The HDD 73 stores not only system software and image data, but also decoration information for a decoration mode used in the present embodiment. As a storage device, a writable nonvolatile memory such as a semiconductor memory may be used instead of a hard disk. The calculation portion 74 serving as a calculation device generates image data to be used by the image formation control portion 61 for image formation from decoration information stored in the HDD 73 and decoration information designated by the user. The details will be described later.

The controller 60 is connected to a network such as a local area network: LAN via a network interface: network I/F 70. The network I/F 70 communicates image information, an execution instruction for image formation, and so on between an external device on the network and the image forming apparatus 100.

Description of Decoration Method

An image decoration method according to the present embodiment will be described. In the present embodiment, a decorative effect in which the glossiness of an image changes in accordance with the direction in which the image is viewed can be added to the image.

Figure 4A:
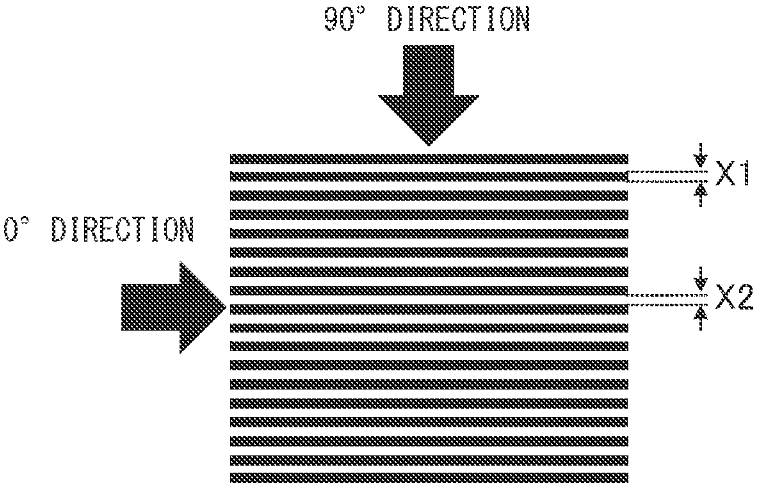
FIGS. 4A to 4C are each a diagram for describing a decorative effect of a thin line pattern.

FIG. 4A is a schematic view of a thin line pattern used in the present embodiment. The thin line pattern is a parallel line pattern in which straight lines parallel to each other extending in a predetermined same direction are arranged at a predetermined pitch. The thickness of the thin line is X1 in terms of the number of dots, and the pitch of the thin lines is X2 in terms of the number of dots. Since the resolution of the image forming apparatus according to the present embodiment is 600 dpi, the size of one dot is 42 In the present embodiment, the decorative effect is realized by transferring the thin line pattern illustrated in FIG. 4A onto the toner image formed on the recording material in accordance with the image information. The toner image will be hereinafter referred to as a base image.

Figure 4B:
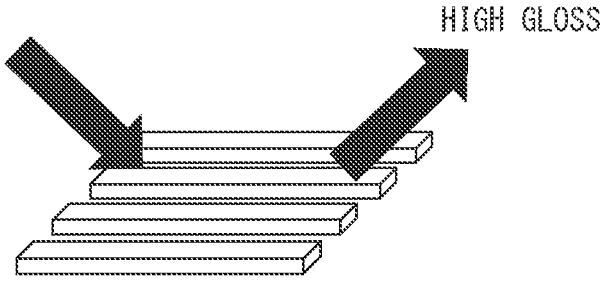
Figure 4C:
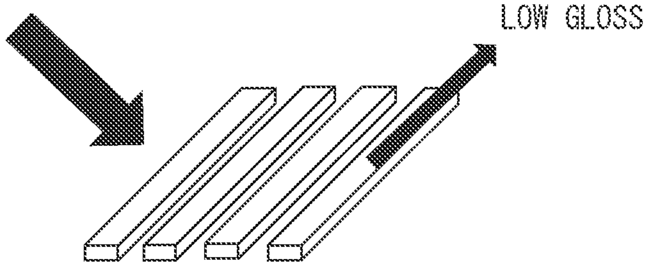

As illustrated in FIG. 4A, when the surface of the recording material on which the thin line pattern has been recorded is viewed in a perpendicular direction, that is, when the recording material is viewed in the vertical direction in a state in which the recording material is placed on a horizontal surface, an angle parallel to each thin line in the thin line pattern is 0°, and an angle perpendicular to each thin line is 90°. The light amount of specular reflection or mirror reflection on the thin line pattern in the case where the thin line pattern is viewed in the direction of 0° as illustrated in FIG. 4B is larger than in the case where the thin line pattern is viewed in the direction of 90° as illustrated in FIG. 4C.

This is because in the case where the thin line pattern is viewed in the direction of 90°, part of light incident on the recording material from a light source is "kicked" by the wall of the thin lines, and thus the reflection light heading toward the specular reflection direction decreases. In other words, this is because part of the light incident from a direction crossing the thin line pattern is reflected by a step portion between the thin lines and regions between the thin lines and is thus reflected in a direction different from the direction of mirror reflection on a virtual plane along the surface of the recording material. In contrast, light incident from a direction parallel to the thin line pattern rarely hits the wall of the thin lines, and is likely to be reflected in the specular reflection direction on the surface of the thin lines or in the regions between the thin lines. That is, in the case of viewing the recording material in a direction crossing the normal direction of the surface of the recording material, the glossiness of the thin line pattern is high (high gloss) when the recording material is viewed in a direction along the thin line pattern as viewed in the normal direction. In contrast, the glossiness of the thin line pattern is low (low gloss) when the recording material is viewed in a direction crossing the thin line pattern as viewed in the normal direction.

The nature of the thin line pattern that the glossiness thereof changes depending on the viewing direction, that is, the anisotropy of the glossiness, is similar in the case where the thin line pattern is formed on a different toner image formed on a recording material in approximately uniform thickness. Therefore, the image forming apparatus 100 of the present embodiment is configured to selectively execute, on the basis of an instruction from a user, a decoration mode for outputting an image to which a decorative effect has been added by using the thin line pattern and a normal mode for outputting an image without using the thin line pattern.

Decoration Mode

Figure 5:
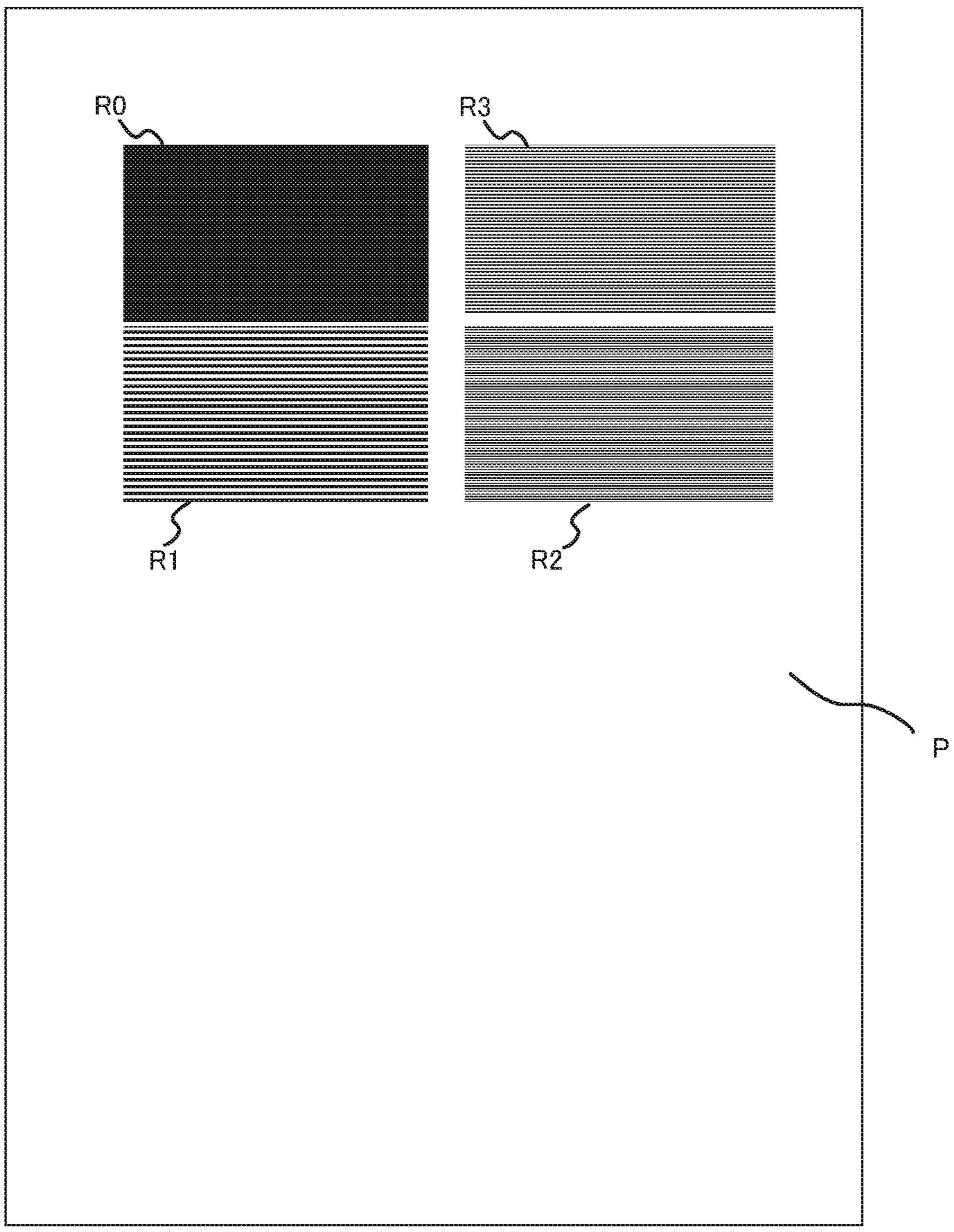
FIG. 5 is a schematic view of thin line patterns according to the first embodiment.

In the present embodiment, four levels can be designated as the decoration level in the case of adding the decorative effect using the thin line pattern. The decoration level indicates the magnitude of change in the glossiness depending on the viewing angle of the image. FIG. 5 is a schematic diagram illustrating the difference in the thin line pattern between the decoration levels. An image R0 on the upper-left side indicates a solid image formed at a decoration level "0" corresponding to the normal mode, and no thin line pattern is formed on the solid image. An image R1, an image R2, and an image R3 respectively indicate thin line patterns used for a decoration level "1", a decoration level "2", and a decoration level "3", and the difference in the glossiness depending on the viewing angle of the image is larger for higher levels. As will be described later, the decoration level can be controlled by changing the thickness and pitch of the thin lines of the thin line pattern. To be noted, FIG. 5 is a schematic diagram for explaining the fact that the decoration level can be controlled by changing the thickness and pitch of the thin lines of the thin line pattern, and thin line patterns used for an actual decoration mode do not have to be identical to the images R1 to R4 illustrated in FIG. 5.

Control Flow

Figure 6:
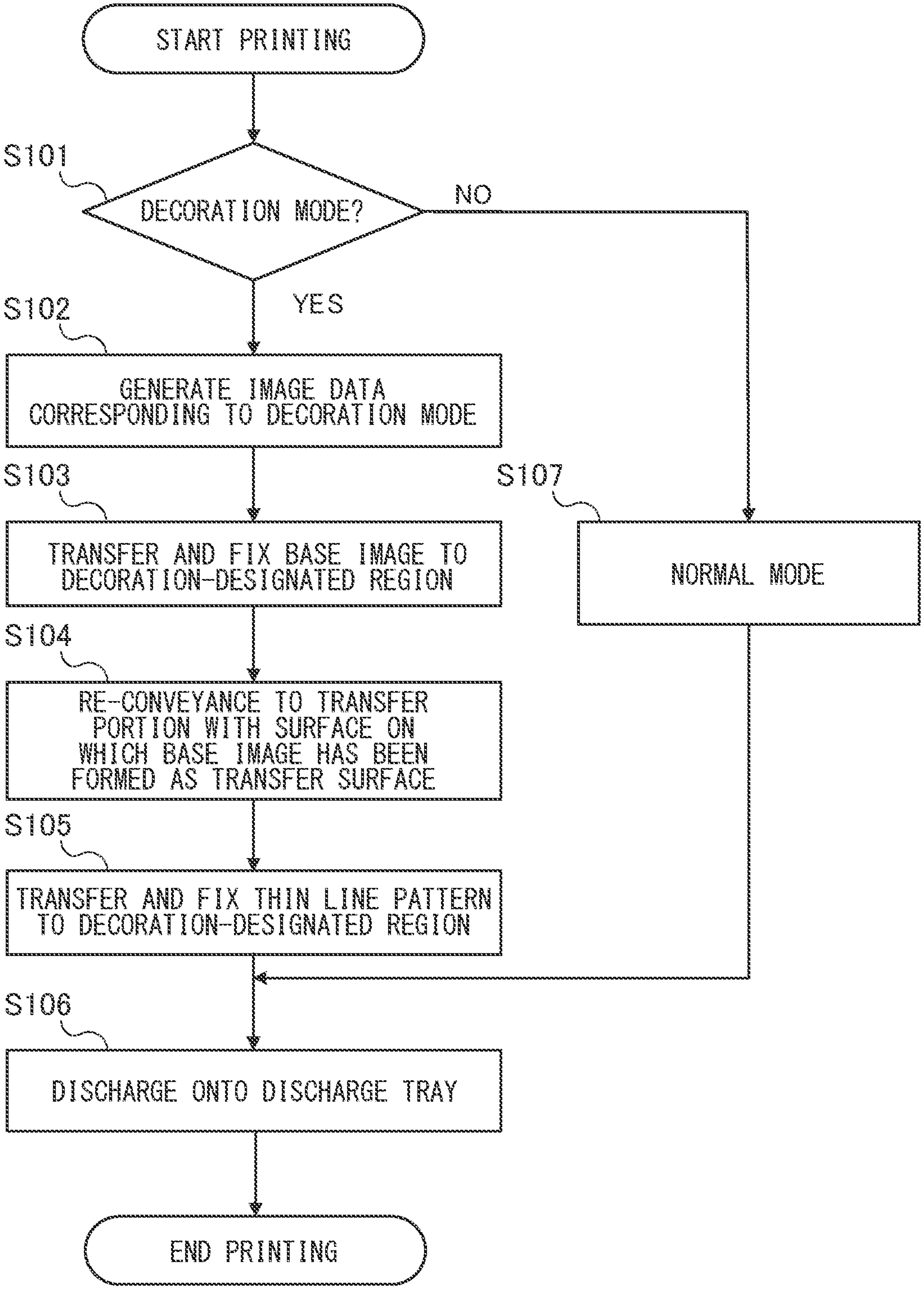
FIG. 6 is a flowchart illustrating an execution procedure of a decoration mode according to the first embodiment.

A flowchart indicating the execution procedure of the decoration mode of the present embodiment will be described with reference to FIG. 6. Each step of this flow that will be described below is realized by the CPU of the controller 60 illustrated in FIG. 3 executing a control program in the ROM.

When the controller 60 receives image information from an external device via the network I/F 70, the controller 60 executes a series of operations for forming an image on the recording material and discharging the recording material, that is, a print job. When the print job is started, in step S101, the controller 60 refers to setting information of the print job received from the external device, and determines whether to perform image formation in the normal mode or the decoration mode. The decoration mode is a first mode of the present embodiment in which the image forming unit forms a first toner image and a second toner image. In the case of the decoration mode, the process proceeds to step S102, and the calculation portion 74 generates image data corresponding to the decoration mode.

In the present embodiment, in an image region where the decorative effect is designated to be applied, a solid image is formed as a base image in the first image forming operation, and a thin line pattern corresponding to the decoration level is formed in the second image forming operation. This image region will be referred to as a decoration-designated region. The solid image is a toner image corresponding to image information serving as a first toner image. In other words, the solid image is a solid image for applying toner on the entirety of the decoration-designated region at an approximately uniform thickness, that is, at an approximately uniform toner application amount. The "image region (printing region)" refers to, for example, a region inside an outline of a text in the case of a text image, or a region inside a figure in the case of a solid figure. In contrast, the thin line pattern is a pattern image to be superimposed on the first toner image on the recording material for adding the decorative effect, and is a toner image serving as a second toner image including a parallel line pattern extending in the same direction. The thin line pattern serving as a second toner image for adding the decorative effect is preferably a toner image using toner of the same color as the base image serving as a first toner image. To be noted, the region where the second toner image is to be formed, that is, the decoration-designated region may be only part of an image formed in the series of image forming operations.

In step S102 described above, the calculation portion 74 generates, on the basis of the image information received from the external device, and the setting information of the decoration level, image data for causing the image forming portion 50 to form the base image, and image data for causing the image forming portion 50 to form the thin line pattern. The controller 60 executes the following process by using the image data of the base image and the thin line pattern generated by the calculation portion 74.

In step S103, the controller 60 executes the first image forming operation to form a solid image serving as the base image in a decoration-designated region of the recording material. At this time, the controller 60 transmits a video signal generated on the basis of the image data of the base image generated by the calculation portion 74 to the exposing unit 7, and thus causes the image forming portion 50 to form the base image serving as a first toner image on the recording material P. The recording material P onto which the base image has been transferred is conveyed to the fixing unit 30, and is subjected to a fixing process.

In step S104, the controller 60 conveys, by the discharge roller pair 20 and the duplex conveyance path 42, the recording material P on which the base image has been formed, such that the surface of the recording material on which the base image has been formed is a transfer surface that opposes the photosensitive drum 1 again in the transfer nip Nt. Specifically, after the recording material P onto which the base image has been transferred in the transfer nip Nt has passed through the fixing unit 30 and the trailing end of the recording material P has passed the position of a switching guide 40 illustrated in FIG. 1, the controller 60 switches the position of the switching guide 40, and rotates the discharge roller pair 20 in a reverse direction. As a result of this, the recording material P is pulled back into the image forming apparatus, and is conveyed to the transfer nip Nt again via the duplex conveyance path 42. At this time, a surface serving as a second surface opposite to the surface of the recording material P serving as a first surface on which the base image has been formed opposes the photosensitive drum 1, and therefore transfer of the thin line pattern is not performed. After the recording material P passes through the fixing unit 30 for the second time, the controller 60 executes reversed conveyance by the discharge roller pair 20 for the second time, and conveys the recording material P to the transfer nip Nt via the duplex conveyance path 42. As a result of this, the recording material P reaches the transfer nip Nt again in a state in which the surface serving as a first surface on which the base image has been formed opposes the photosensitive drum 1.

In step S105, the controller 60 performs the second image forming operation to form the thin line pattern on the base image that has been already formed in the decoration-designated region of the recording material P. At this time, the controller 60 transmits a video signal generated on the basis of the image data of the thin line pattern generated by the calculation portion 74 to the exposing unit 7, and thus causes the image forming portion 50 to form the thin line pattern serving as a second toner image on the recording material P. Subsequently, the recording material P is conveyed to the fixing unit 30, and is subjected to the fixing process for the second time. In step S106, the discharge roller pair 20 discharges the recording material P, and thus a print job for the decoration mode on one sheet of the recording material P is completed.

In contrast, in the case where the setting of the print job is the normal mode in step S101, the process proceeds to step S107, and the controller 60 performs normal image formation. In this case, the calculation portion 74 does not generate the image data of the thin line pattern. The controller 60 transmits a video signal generated on the basis of the image information received from the external device to the exposing unit 7, and thus causes the image forming portion 50 to form the toner image corresponding to the image information on the recording material P. In addition, in this case, the recording material P onto which the toner image corresponding to the image information has been transferred in the transfer nip Nt and which has been subjected to the fixing process in the fixing unit 30 is discharged as it is by the discharge roller pair 20. That is, in the case where the result of step S101 is NO, the controller 60 executes a second mode in which the image forming unit forms the toner image corresponding to the image information without forming the second toner image and the fixing unit fixes the toner image corresponding to the image information.

To be noted, although an operation in the case of forming an image to which the decorative effect is added on one surface of the recording material P has been described here, the image to which the decorative effect is added may be formed on each surface of the recording material P. In this case, the controller 60 may form the base image on the first surface in the first image forming operation, the base image on the second surface in the second image forming operation, the thin line pattern on the first surface in the third image forming operation, and the thin line pattern on the second surface in the fourth image forming operation.

Setting of Decoration Level

Figure 7:
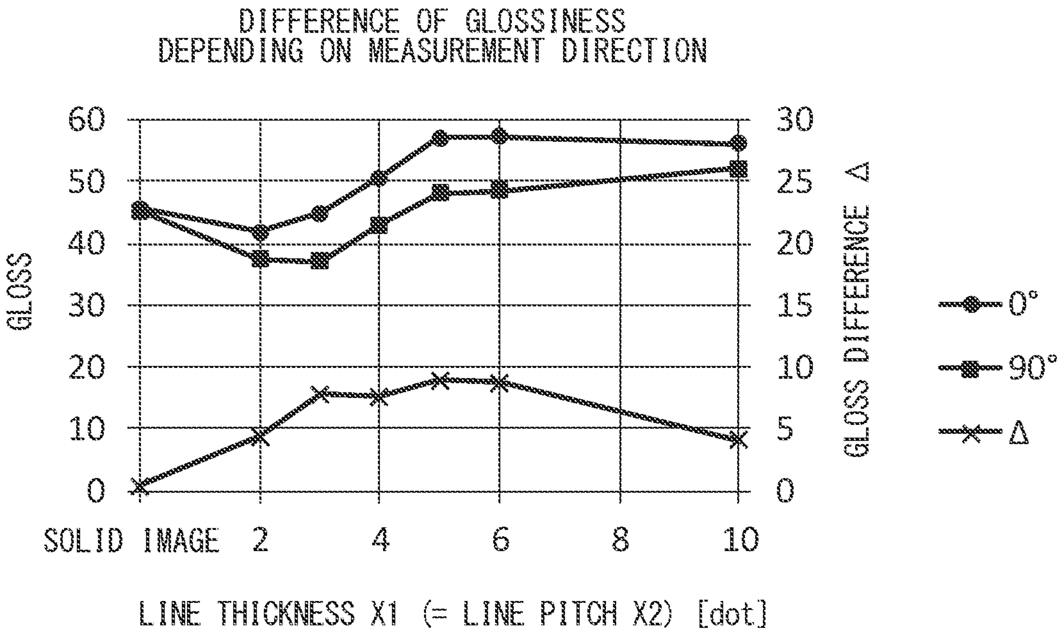
FIG. 7 is a graph illustrating measurement results of a decorative effect according to the first embodiment.

Here, adjustment of the thin line pattern according to the setting of the decoration level will be described. FIG. 7 indicates the glossiness (gloss value) and the difference thereof (gloss difference Δ) measured in the directions of 0° and 90° with respect to the thin line pattern in the case where the line thickness and the line pitch of the thin line pattern are changed. Here, the thickness X1 of the thin lines and the pitch X2 of the thin lines are set to be equal, and the glossiness of thin line patterns generated while changing the values of X1 and X2, that is, the number of dots of the thickness and pitch of the thin lines, in a range of 1 to 10 dots, and the glossiness of a solid image in which the thin line pattern is not formed are measured. The recording material used for the measurement is "Futura 100 lb (manufactured by VERSO), grammage: 148 $g/m^2$". In addition, as the glossiness, the glossiness at an incident angle of 75° is measured by using PG-1 manufactured by Nippon Denshoku Industries Co., Ltd.

From the results illustrated in FIG. 7, it can be seen that the decorative effect changes in accordance with the roughness of the thin line pattern. For example, the gloss difference Δ is the largest in the case where the thin line thickness X1 and the thin line pitch X2 are each 6 dots, and is smaller in the case where the thin line thickness X1 and the thin line pitch X2 are each 10 dots than in the case where X1 and X2 are each 6 dots. That is, by changing the thin line thickness X1 and the thin line pitch X2, the level of the decorative effect in which the glossiness is made to differ depending on the direction in which the image is viewed can be changed.

In the present embodiment, a solid image, that is, only the base image is formed in the case where the decoration level is 0. A thin line pattern whose thickness X1 and pitch X2 are each 10 dots is formed in the case where the decoration level is 1, a thin line pattern whose thickness X1 and pitch X2 are each 3 dots is formed in the case where the decoration level is 2, and a thin line pattern whose thickness X1 and pitch X2 are each 6 dots is formed in the case where the decoration level is 3. That is, in step S102 of the flow described above, the calculation portion 74 generates image data of the thin line pattern by using the thickness X1 and pitch X2 predetermined in accordance with the setting value of the decoration level. As described above, by adjusting the thin line pattern in four levels, the difference of the glossiness depending on the viewing direction can be controlled.

To be noted, the thin line pattern whose thickness X1 and pitch X2 is 1 dot can be referred to as the finest thin line pattern that can be realized by the image forming apparatus 100. In addition, the upper limit of the period of the thin line pattern in the present embodiment is 20 dots, that is, about 0.84 mm in 600 dpi. However, for example, the upper limit of the period of the thin line pattern may be set to 12 dots, that is, about 0.5 mm in 600 dpi, which corresponds to a thin line pattern of the decoration level 3 of the present embodiment.

Modification Example

Figure 8A:
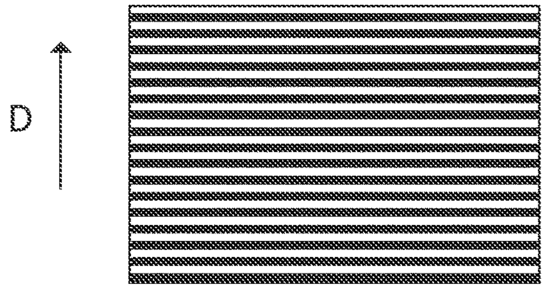
FIGS. 8A to 8E are each a diagram illustrating an example of a pattern image for adding a decorative effect.
Figure 8B:
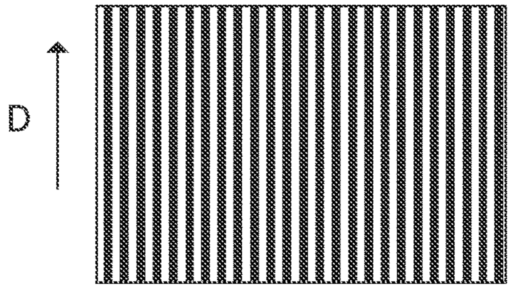
Figure 8C:
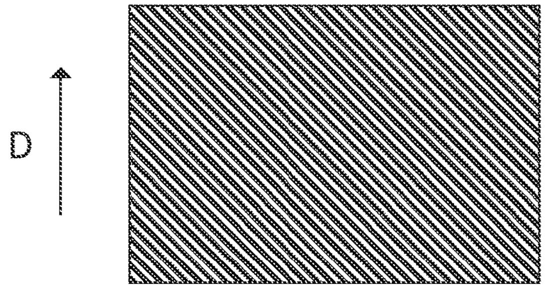
Figure 8D:
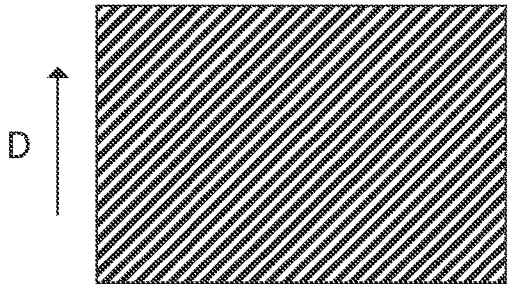

Examples of the direction of the thin line pattern for adding the decorative effect include a direction perpendicular to the conveyance direction D of the recording material, that is, the main scanning direction of the image formation or the sheet width direction, as illustrated in FIG. 8A, but the direction of the thin line pattern may be a different direction. For example, the thin line pattern may be constituted by thin lines parallel to the conveyance direction D as illustrated in FIG. 8B, or the thin line pattern may be inclined by an angle of 45° with respect to the conveyance direction D as illustrated in FIGS. 8C and 8D. That is, as the second toner image, a plurality of patterns that are each constituted by parallel lines extending in the same direction and whose directions in which the parallel lines thereof extend differ from each other may be selectively used.

In addition, the pattern image that adds the decorative effect may be a combination of a plurality of thin line patterns whose directions differ from each other as exemplified in FIGS. 8A to 8C, that is, a plurality of thin line patterns whose directions differ from each other may be superimposed on each other. That is, the second toner image may be a combination of a first pattern in which parallel lines in a first direction are arranged at a predetermined first pitch and a second pattern in which parallel lines in a second direction different from the first direction are arranged at a predetermined second pitch, in which the first pattern and the second pattern are superimposed on each other. For example, in the case of a pattern that is a combination of the thin line patterns of FIGS. 8A and 8B, the pattern has anisotropy in a sense that the glossiness in the case of viewing the pattern at an angle of 0° or 90° with respect to the conveyance direction D is different from the glossiness in the case of viewing the pattern at an angle of ±45° with respect to the conveyance direction D.

Figure 8E:
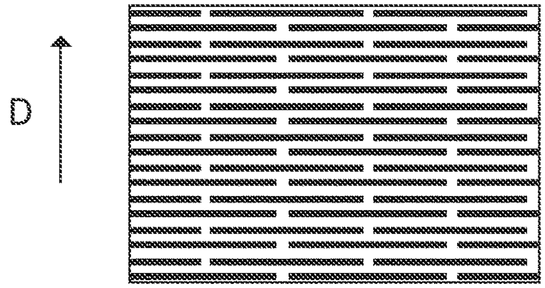

In addition, the pattern image for adding the decorative effect is not limited to a pattern image constituted by parallel lines as long as the pattern image has anisotropy. For example, also in a pattern image in which rectangular shapes elongated in the same direction, or line segments extending in the same direction, are arranged at a constant pitch as illustrated in FIG. 8E, the glossiness differs between a case where the pattern image is viewed in a long side direction of the rectangular shapes and a case where the pattern image is viewed in a short side direction of the rectangular shapes. The "anisotropy" refers to a state in which, in the case of cutting the pattern image along a straight line in a certain direction, the frequency of appearance of boundaries (edges) between a toner image region and a non-toner image region varies depending on the cutting direction. This is because, depending on the cutting direction, if the appearance frequency of the edges of the toner image is high or low, the proportion of light reflected in a direction different from the specular reflection direction at the edge portion is higher or lower when the image is viewed from that direction, and therefore the glossiness differs. To be noted, in the case of the thin line patterns illustrated in FIGS. 8A to 8D, the number of times the cutting line passes through the boundaries is 0 when the thin line pattern is cut in a direction parallel to the thin lines, the cutting line passes through the boundaries twice as many times as the number of thin lines when the thin line pattern is cut in a direction perpendicular to the thin lines, and therefore the anisotropy is very high and the difference of the glossiness is likely to be obtained.

In addition, in the present embodiment, a configuration in which transfer and fixation of a solid image serving as a base image are performed first and then transfer and fixation of the thin line pattern for adding the decorative effect are performed is employed. Instead of this, a configuration in which transfer and fixation of the thin line pattern serving as a second toner image are performed first and then transfer and fixation of the solid image serving as a first image are performed may be employed. Also in this case, recesses and protrusions along the direction of the thin line pattern are formed on the surface of the image on the recording material by forming the solid image on the thin line pattern, and therefore the glossiness of the image differs depending on the viewing angle. In addition, the method for setting the decoration level is not limited to the method described above, and the decoration level may be changeable among three or less levels or five or more levels including a configuration in which the decoration level can be changed not stepwise but continuously.

Second Embodiment

An embodiment of a monochromatic image forming apparatus has been described in the first embodiment, and the present embodiment will be described by using an embodiment of a color image forming apparatus. In the description below, it is assumed that elements denoted by the same reference signs as in the first embodiment have substantially the same configurations and effects as those described in the first embodiment.

Figure 9:
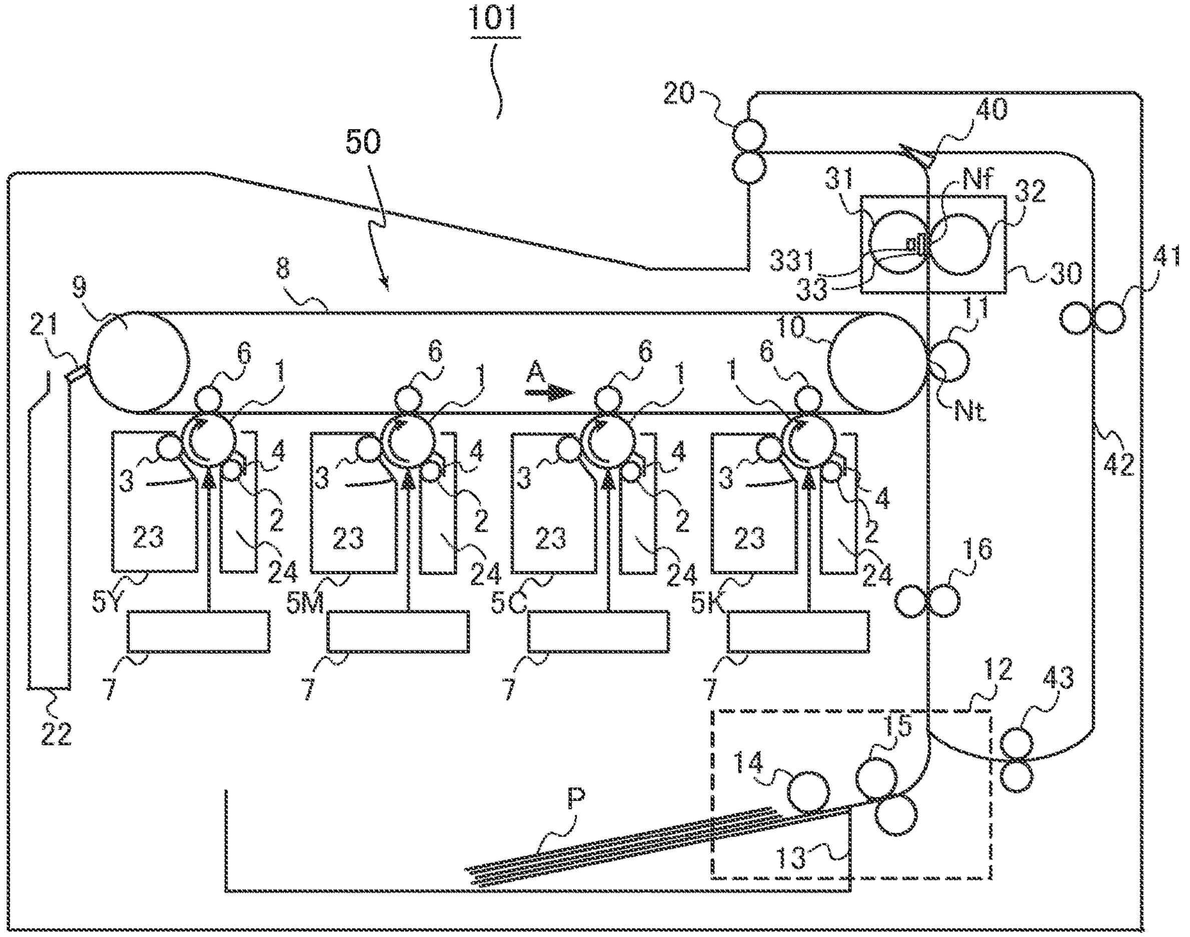
FIG. 9 is a schematic view of a color image forming apparatus.

First, the overall configuration of the present embodiment will be described. FIG. 9 is a schematic diagram illustrating a sectional configuration of an image forming apparatus 101 according to the present embodiment. The image forming apparatus 101 is a color laser printer that forms an image on the recording material P by using an electrophotographic system.

The image forming apparatus 101 includes, as an image forming unit that forms a toner image on the recording material P, the image forming portion 50 including four process cartridges 5Y, 5M, 5C, and 5K, an intermediate transfer belt unit, and a secondary transfer roller 11 serving as a transfer member. The process cartridges 5Y to 5K are each a process station attachable to and detachable from the apparatus body of the image forming apparatus 101. The process cartridges 5Y to 5K substantially have the same configuration, and form toner images using developer containing toner of different colors, that is, yellow (Y), magenta (M), cyan (C), and black (K), respectively. The process cartridges 5Y to 5K each include a toner container 23, a photosensitive drum 1 that is an electrophotographic photosensitive member serving as an image bearing member, a charging roller 2, a developing roller 3, a cleaning blade 4, and a waste toner container 24. The exposing unit 7 is disposed below each of the process cartridges 5Y to 5K.

In image formation, the photosensitive drum 1 is rotationally driven, and the surface of the photosensitive drum 1 is uniformly charged to a predetermined polarity and predetermined potential by the charging roller 2. Then, the photosensitive drum 1 is exposed by the exposing unit 7. At this time, the exposing unit 7 exposes the photosensitive drum 1 on the basis of a video signal corresponding to a color component image of each color corresponding to the image information, that is, a color component image of yellow, magenta, cyan, or black. As a result of this, an electrostatic latent image corresponding to the color component image of a corresponding color is formed on the photosensitive drum 1 of each of the process cartridges 5Y to 5K. The electrostatic latent image formed on the photosensitive drum 1 is developed by being provided with developer from the developing roller 3, and is visualized as the toner image of the corresponding color. For example, the developer is a negatively-chargeable nonmagnetic one-component toner, and the electrostatic latent image is developed by a nonmagnetic one-component contact development system.

The intermediate transfer belt unit includes an intermediate transfer belt 8, a driving roller 9, a secondary transfer opposing roller 10, a belt cleaning blade 21, and a belt toner box 22. In addition, the intermediate transfer belt unit includes four transfer rollers 6 serving as primary transfer rollers arranged on the inner circumferential side of the intermediate transfer belt 8 to respectively oppose the photosensitive drums 1. When the driving roller 9 is rotated by an unillustrated motor, the intermediate transfer belt 8 circulates, and the secondary transfer opposing roller 10 is rotated in accordance with this. The photosensitive drums 1 rotate in an arrow direction, the intermediate transfer belt 8 circulates in an arrow A direction, and a primary transfer bias of a positive polarity is applied to the transfer rollers 6. As a result of this, the toner images on the photosensitive drums 1 are sequentially transferred onto the intermediate transfer belt 8 through primary transfer starting from the toner image on the photosensitive drum 1 of the process cartridge 5Y. At this time, since the start timing of exposure is synchronized such that the toner images of four colors are superimposed on one another on the intermediate transfer belt 8, a full-color toner image is formed on the intermediate transfer belt 8.

The full-color toner image borne on the intermediate transfer belt 8 is conveyed to the transfer nip Nt that is a nip portion serving as a secondary transfer portion between the intermediate transfer belt 8 and the secondary transfer roller 11. Further, a bias of a positive polarity is applied to the secondary transfer roller 11, and thus the full-color toner image is transferred onto the recording material P in the transfer nip Nt. To be noted, the cleaning blade 4 of the photosensitive drum 1 comes into pressure contact with the photosensitive drum 1, and removes residues on the photosensitive drum 1 such as residual toner remaining on the surface of the photosensitive drum 1 without being transferred onto the intermediate transfer belt 8 through primary transfer. In addition, the belt cleaning blade 21 comes into pressure contact with the intermediate transfer belt 8 stretched over the driving roller 9, and removes residues on the intermediate transfer belt 8 such as residual toner remaining on the surface of the intermediate transfer belt 8 without being transferred onto the recording material P through secondary transfer.

A feeding conveyance apparatus 12 includes the feeding roller 14 that feeds the recording material P from the feeding cassette 13 accommodating the recording material P, and the conveyance roller pair 15 that conveys the recording material P that has been fed. Then, the recording material P conveyed from the feeding conveyance apparatus 12 is conveyed to the transfer nip Nt by the registration roller pair 16, and the toner image is transferred thereonto.

The recording material P having passed the transfer nip Nt is conveyed to the fixing unit 30. The fixing unit 30 is a fixing unit of a film heating system including the fixing film 31 and the pressurizing roller 32 in pressure contact with the fixing film 31. The fixing film 31 includes a nip forming member including the heater 33. The thermistor 331 that measures the temperature of the heater 33 is attached to the heater 33. The recording material P is heated and pressurized while being nipped and conveyed by the fixing film 31 and the pressurizing roller 32 in the fixing nip Nf between the pressurizing roller 32 and the nip forming member, and is thus subjected to a fixing process of the toner image. Then, the recording material P is discharged to the outside of the image forming apparatus 101 by the discharge roller pair 20.

The image forming apparatus 101 is capable of performing duplex printing on the recording material P. In the case of duplex printing, after the trailing end of the recording material P having passed through the fixing unit 30 passes the position of the switching guide 40, first, the position of the switching guide 40 is switched to the duplex conveyance path side. In addition, the rotation direction of the discharge roller pair 20 is switched to the duplex conveyance path 42 side by an unillustrated reverse clutch that determines the rotation direction of the discharge roller pair 20. As a result of this, the conveyance direction of the recording material P is reversed, and the recording material P is conveyed to the duplex conveyance path 42. In the duplex conveyance path 42, the duplex conveyance roller pairs 41 and 43 convey the recording material P again toward the registration roller pair 16. After passing the registration roller pair 16, transfer and fixation of a toner image are performed on a back surface of the recording material P serving as a second surface in the same process as on a front surface of the recording material P serving as a first surface, and then the recording material P is discharged to the outside of the image forming apparatus 101 by the discharge roller pair 20. The configuration of the fixing unit 30 and the hardware configuration of the image forming apparatus 101 are substantially the same as those described in the first embodiment with reference to FIGS. 2 and 3.

Also in the color image forming apparatus 101 as described above, the decoration mode can be executed in substantially the same manner as in the first embodiment. That is, after forming a base image serving as a first toner image on the recording material P, the recording material P may be conveyed such that the surface on which the base image has been formed opposes the intermediate transfer belt 8 again in the transfer nip Nt, and a thin line pattern serving as a second toner image may be formed on the base image.

Figure 10:
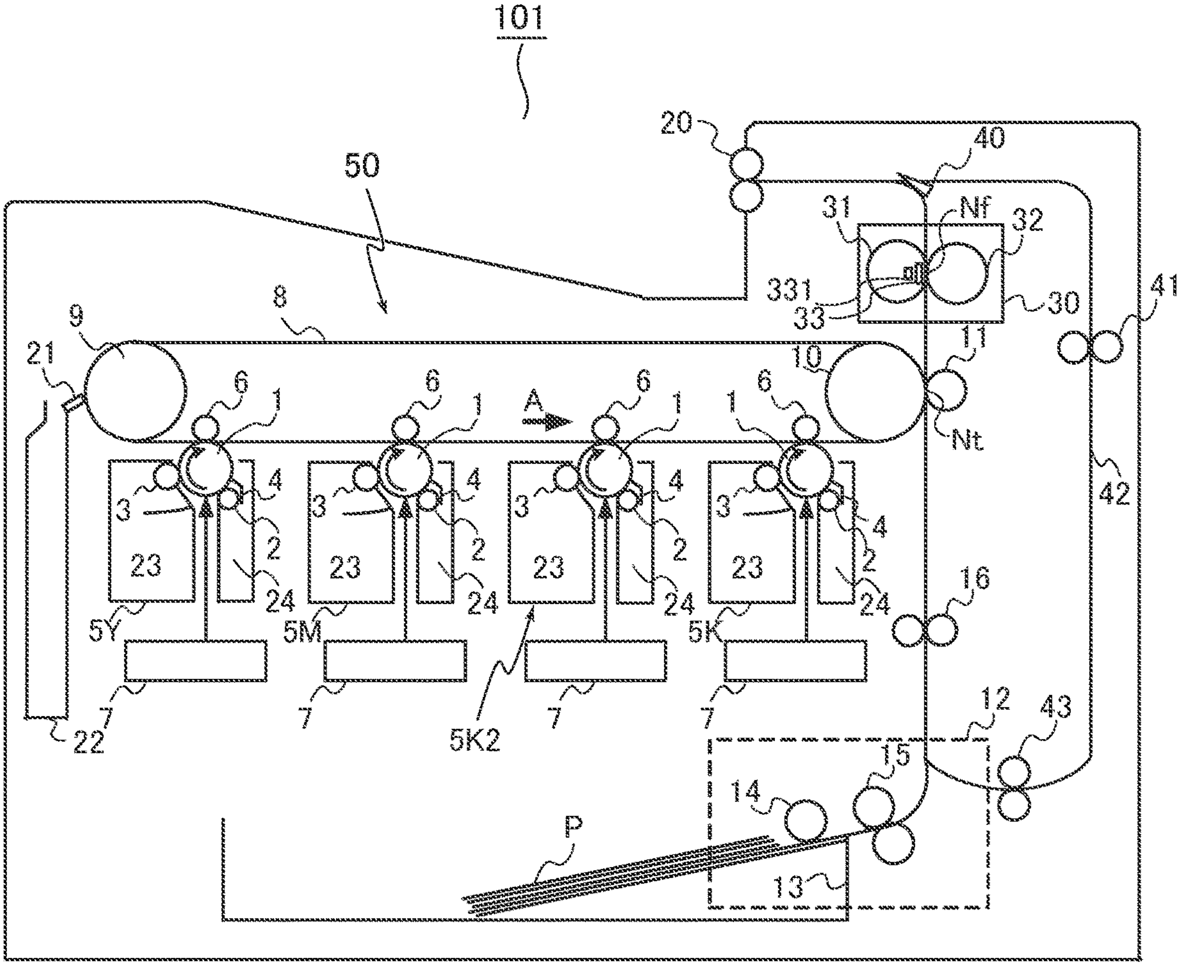
FIG. 10 is a schematic view of an image forming apparatus according to a second embodiment.

In addition, in the case of the color image forming apparatus 101, the decoration mode can be also realized by a method of forming a base image serving as a first toner image by using part of the plurality of process cartridges and forming a thin line pattern serving as a second toner image for adding the decorative effect by using another part of the plurality of process cartridges. According to this method, the decoration mode can be executed with only one fixing process instead of causing the recording material P to pass through the fixing unit 30 a plurality of times in the case of executing the decoration mode. For example, in FIG. 10, the cyan process cartridge 5C of FIG. 9 is replaced by a second black process cartridge 5K2. In this case, the black process cartridge 5K2 can form a base image, the black process cartridge 5K can form a thin line pattern, and the base image and the thin line pattern can be simultaneously transferred onto the recording material P in the transfer nip Nt.

Figure 11:
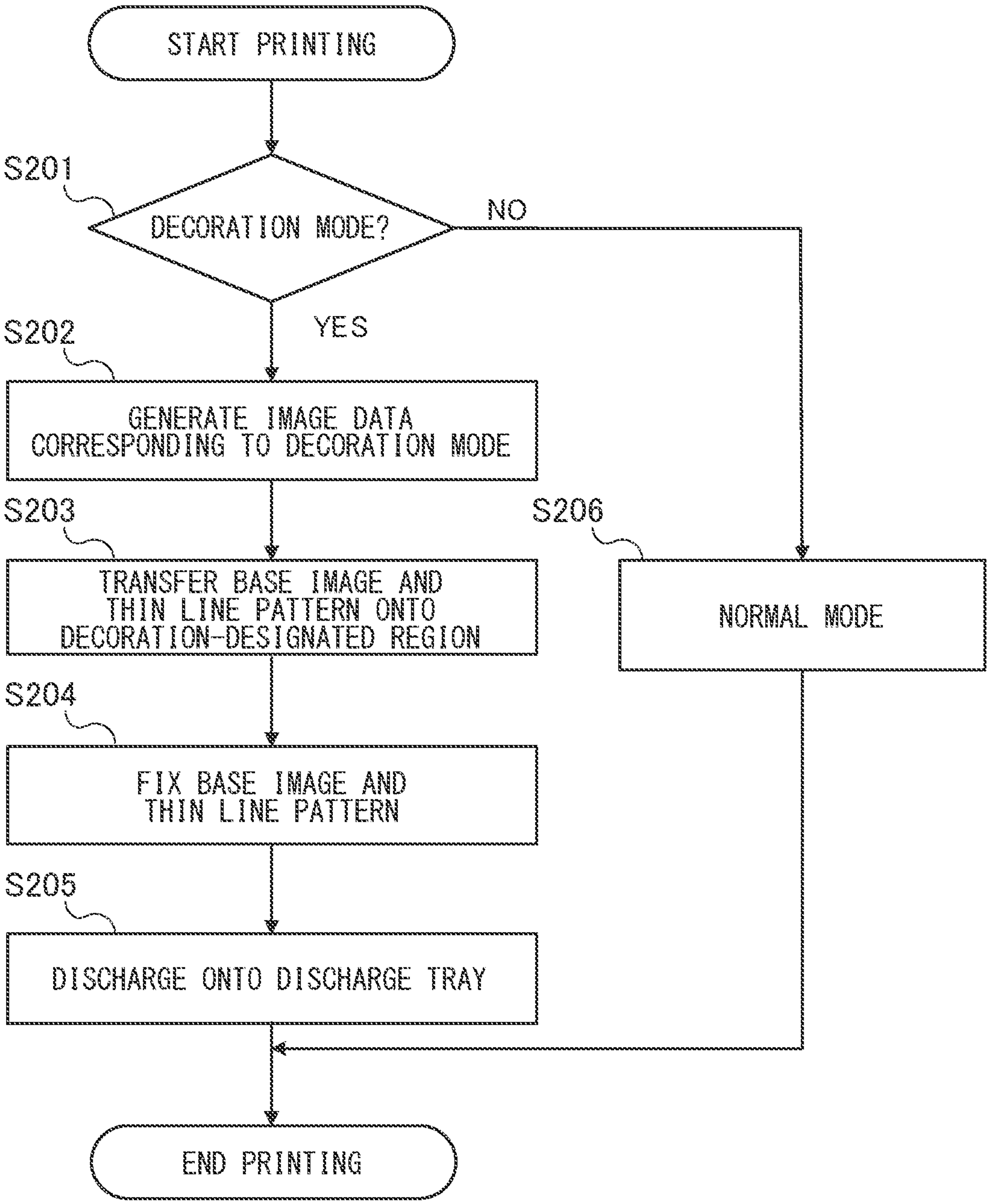
FIG. 11 is a flowchart illustrating an execution procedure of a decoration mode according to the second embodiment.

FIG. 11 illustrates a flowchart indicating the execution procedure of the decoration mode of the present embodiment. When the print job is started, in step S201, the controller 60 refers to setting information of the print job received from the external device, and determines whether to perform image formation in the normal mode serving as a second mode or the decoration mode serving as a first mode. In the case of the decoration mode, the process proceeds to step S202, and the calculation portion 74 generates image data corresponding to the decoration mode.

In step S202, the calculation portion 74 generates, on the basis of the image information received from the external device, and the setting information of the decoration level, image data for causing the process cartridge 5K2 to form a solid image serving as the base image and causing the process cartridge 5K to form the thin line pattern. In step S203, the controller 60 executes the image forming operation to form the base image and the thin line pattern in a decoration-designated region of the recording material P. At this time, the controller 60 transmits a video signal generated on the basis of the image data of the base image and the thin line pattern generated by the calculation portion 74 to the exposing units 7 corresponding to the process cartridges 5K2 and 5K, and thus forms the base image and the thin line pattern. Subsequently, in step S204, the recording material P is conveyed to the fixing unit 30, and is subjected to a fixing process. At this time, the base image and the thin line pattern are simultaneously subjected to the fixing process. Also in the case where the base image and the thin line pattern are simultaneously subjected to the fixing process, the recesses and protrusions, that is, difference in the thickness of the toner layer, corresponding to the thin line pattern remain on the surface of the fixed image, and therefore the decorative effect in which the glossiness differs depending on the image viewing direction can be obtained. In step S205, the recording material P is discharged by the discharge roller pair 20, and the print job in the decoration mode on one sheet of the recording material P is completed.

In contrast, in the case where the setting of the print job is the normal mode in step S201, the process proceeds to step S206, and the controller 60 performs normal image formation. In this case, the calculation portion 74 does not generate the image data of the thin line pattern. That is, in the case where the result of step S201 is NO, the controller 60 executes a second mode in which the image forming unit forms the toner image corresponding to the image information without forming the second toner image and the fixing unit fixes the toner image corresponding to the image information.

As described above, in the present embodiment, in an image forming apparatus including a plurality of process cartridges, the fixing process is performed after transferring the base image and the thin line pattern onto the recording material P so as to be superimposed on each other. That is, the image forming unit of the present embodiment includes a first image bearing member that bears a toner image, a second image bearing member that bears a toner image, and a transfer unit that transfers the toner images from the first image bearing member and the second image bearing member onto a recording material. The photosensitive drum 1 of the process cartridge 5K2 is an example of the first image bearing member, the photosensitive drum 1 of the process cartridge 5K is an example of the second image bearing member, and the intermediate transfer belt unit and the secondary transfer roller 11 are an example of the transfer unit. In addition, the controller causes the image forming unit to form a first toner image on the first image bearing member and form a second toner image on the second image bearing member, causes the transfer unit to transfer the first toner image and the second toner image onto the recording material, and then causes the fixing unit to fix the first toner image and the second toner image to the recording material. As a result of this, the decoration mode can be realized without repeating the re-conveyance of the recording material P using the duplex conveyance path 42, and therefore the productivity can be improved.

To be noted, although the thin line pattern is formed by one of a plurality of process cartridges using toner of the same color in the present embodiment, the thin line pattern may be formed by one of a plurality of process cartridges using toner of a different color. For example, the thin line pattern may be formed by the process cartridge 5K using clear toner instead of black toner.

In addition, the configuration of the image forming apparatus using a plurality of process cartridges is not limited to an intermediate transfer system of a tandem type. For example, a configuration in which a plurality of process cartridges of a direct transfer system are arranged along the conveyance path of the recording material may be employed.

Third Embodiment

As a third embodiment, an embodiment in which the absolute value of the glossiness is changeable will be described. The present embodiment will be described by using the monochromatic image forming apparatus 100 similarly to the first embodiment. In the description below, it is assumed that elements denoted by the same reference signs as in the first embodiment have substantially the same configurations and effects as those described in the first embodiment.

In the first embodiment, as illustrated in FIG. 7, the magnitude of the glossiness (gloss value) differs depending on the thickness X1 and the pitch X2 of the thin lines of the thin line pattern, and the absolute value of the glossiness also changes when the decoration level, that is, the difference of the glossiness according to the viewing direction, is changed. In the present embodiment, an additional fixing process is performed on the recording material P after the operation of the decoration mode similar to that of the first embodiment, and thus the amount of variation of the absolute value of the glossiness is reduced.

Figure 12:
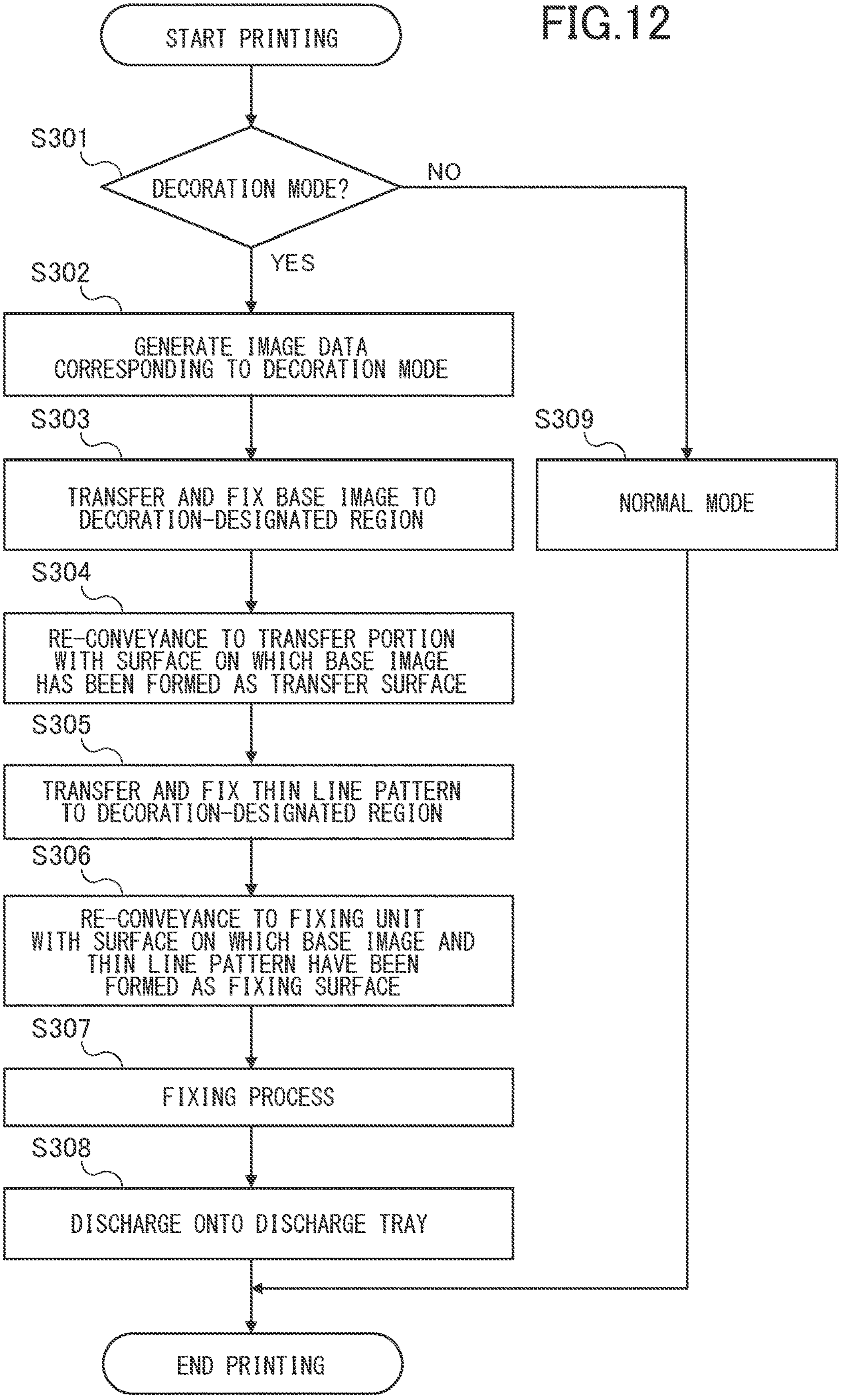
FIG. 12 is a flowchart illustrating an execution procedure of a decoration mode according to a third embodiment.

FIG. 12 is a flowchart illustrating an execution procedure of the decoration mode of the present embodiment. When the print job is started, in step S301, the controller 60 refers to setting information of the print job received from the external device, and determines whether to perform image formation in the normal mode serving as a second mode or the decoration mode serving as a first mode. In the case of the decoration mode, the process proceeds to step S302, and the calculation portion 74 generates image data corresponding to the decoration mode. In step S302, the calculation portion 74 generates, on the basis of the image information received from the external device and the setting information of the decoration level, image data for causing the image forming portion 50 to form the base image, and image data for causing the image forming portion 50 to form the thin line pattern.

In step S303, the controller 60 executes the first image forming operation to form a solid image serving as the base image in a decoration-designated region of the recording material. At this time, the controller 60 transmits a video signal generated on the basis of the image data of the base image generated by the calculation portion 74 to the exposing unit 7, and thus causes the image forming portion 50 to form the base image serving as a first toner image on the recording material P. The recording material P onto which the base image has been transferred is conveyed to the fixing unit 30, and is subjected to a fixing process.

In step S304, the controller 60 conveys, by the discharge roller pair 20 and the duplex conveyance path 42, the recording material on which the base image has been formed, such that the surface of the recording material P on which the base image has been formed is a transfer surface that opposes the photosensitive drum 1 again in the transfer nip Nt. The procedure of conveyance is substantially the same as in the first embodiment. In step S305, the controller 60 performs the second image forming operation to form the thin line pattern on the base image that has been already formed in the decoration-designated region of the recording material P. Subsequently, the recording material P is conveyed to the fixing unit 30, and is subjected to the fixing process for the second time, that is, the first fixing process on the thin line pattern.

In step S306, the controller 60 further conveys, by the discharge roller pair 20 and the duplex conveyance path 42, the recording material P on which the base image and the thin line pattern have been formed, such that the surface of the recording material P on which the base image has been formed is a fixing surface that opposes the fixing film 31 again in the fixing nip Nf. The procedure of conveyance is substantially the same as in step S104 of the first embodiment. That is, after the trailing end of the recording material P subjected to the first fixing process on the thin line pattern has passed the position of the switching guide 40 illustrated in FIG. 1, the controller 60 switches the position of the switching guide 40, and rotates the discharge roller pair 20 in a reverse direction. As a result of this, the recording material P is pulled back into the image forming apparatus, and is conveyed to the fixing nip Nf again via the duplex conveyance path 42. At this time, a surface opposite to the surface of the recording material P on which the base image and the thin line pattern have been formed opposes the fixing film 31. After the recording material P passes through the fixing unit 30, the controller 60 further executes reversed conveyance by the discharge roller pair 20, and conveys the recording material P to the fixing nip Nf via the duplex conveyance path 42. As a result of this, the recording material P reaches the fixing nip Nf again in a state in which the surface on which the base image and the thin line pattern have been formed opposes the fixing film 31.

In step S307, the controller 60 causes the fixing unit 30 to perform an additional fixing process on the surface of the recording material P on which the base image and the thin line pattern have been formed. In step S308, the recording material P is discharged by the discharge roller pair 20, and thus the print job of the decoration mode on one sheet of the recording material P is completed.

In contrast, in the case where the setting of the print job is the normal mode in step S301, the process proceeds to step S309, and the controller 60 performs normal image formation. In this case, formation of the thin line pattern and the additional fixing process are not performed.

Figure 13:
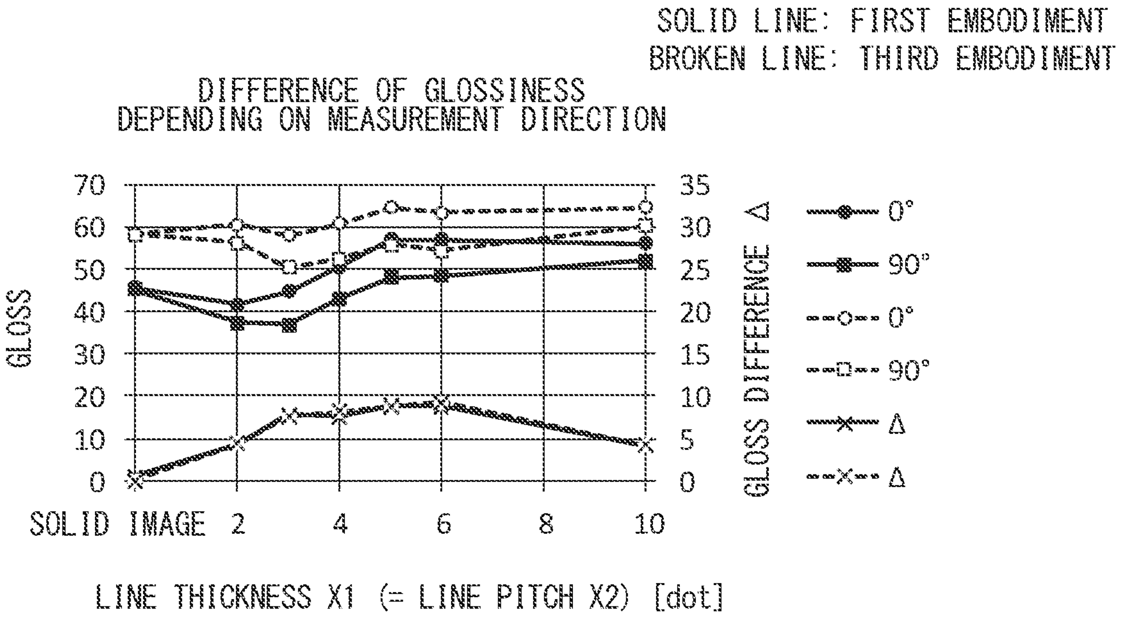
FIG. 13 is a graph illustrating measurement results of the decorative effect according to the third embodiment.

FIG. 13 indicates, for comparison with the first embodiment and the present embodiment, the glossiness (gloss value) and the difference thereof (gloss difference Δ) measured in the directions of 0° and 90° with respect to the thin line pattern in the case where the line thickness and the line pitch of the thin line pattern are changed. The solid line indicates the first embodiment, and the broken line indicates the third embodiment. Here, the thickness X1 of the thin lines and the pitch X2 of the thin lines are set to be equal, and the glossiness of thin line patterns generated while changing the values of X1 and X2, that is, the number of dots of the thickness and pitch of the thin lines, in a range of 1 to 10 dots, and the glossiness of a solid image in which the thin line pattern is not formed are measured.

Comparing the third embodiment indicated by the broken line with the first embodiment indicated by the solid line, it can be seen that, although the value of the gloss difference Δ is not different, the amount of variation of the gloss value that has varied depending on the values of the thickness X1 and the pitch X2 of the thin lines is reduced. For example, in the third embodiment, since the gloss value obtained by measurement from the direction of 0° in the case where the thin line thickness X1 and the thin line pitch X2 are each 3 dots is 58 and the gloss value obtained by measurement from the direction of 0° in the case where the thin line thickness X1 and the thin line pitch X2 are each 5 dots is 65, the amount of variation of the gloss value is 7. In contrast, in the first embodiment, since the gloss value obtained by measurement from the direction of 0° in the case where the thin line thickness X1 and the thin line pitch X2 are each 3 dots is 45 and the gloss value obtained by measurement from the direction of 0° in the case where the thin line thickness X1 and the thin line pitch X2 are each 5 dots is 57, the amount of variation of the gloss value is 12.

The reason why the amount of variation of the gloss value when the thickness X1 and the pitch X2 of the thin lines are changed can be reduced is as follows. When the toner surface fixed to the recording material P is flatter, more light is specularly reflected on the surface of the recording material P, and therefore the glossiness becomes higher. In the first embodiment, in the case where the thin line pattern is formed by using thin lines whose thickness X1 is 2 dots, 3 dots, 4 dots, or the like, the thickness of the line is so small that each line includes less flat portions than lines of a thickness of 5 dots or more, and therefore the glossiness (gloss value) thereof is lower. In contrast, in the third embodiment, the fixing process is performed a plurality of times on the surface on which the thin line pattern has been formed as the fixing surface after transferring the thin line pattern onto the recording material P. In other words, the controller causes the re-conveyance portion to convey the recording material again to the fixing unit after the recording material has passed through the fixing unit in a state in which the second toner image has been formed, and thus causes the fixing unit to fix the second toner image to the recording material. As a result of this, the area of flat portions increases also for very thin lines of a thickness of 2 to 4 dots, and therefore the glossiness of the decoration-designated region becomes closer to the glossiness of the case where relatively thicker thin lines having a thickness of 5 dots or more are used.

As described above, according to the present embodiment, the level of the decorative effect in which the glossiness changes depending on the image viewing direction can be changed, and the variation of the absolute value of the glossiness according to the level change of the decorative effect can be reduced. As a result of this, the range in which the level of the decorative effect and the absolute value of the glossiness in the decoration-designated region can be changed in accordance with the user's desire can be widened, and thus it becomes easier to meet the user's needs.

According to the present disclosure, a decorative effect in which the glossiness changes depending on the image viewing direction can be added to an image.

Incidentally, to prevent easy forgery of a product produced by an image forming apparatus, generating a security image that is a gloss image whose density is the same for the background and the foreground and whose glossiness is different between the background and the foreground is known. The security image also known as a security mark is an image whose foreground such as a symbol can be easily recognized by a human eye but whose difference in the density between the foreground and the background is difficult to detect for an image scanner, and guarantees that a document or the like on which the security image is recorded is the original. Since a typical image scanner reads the intensity of scattered light from the document from a direction perpendicular to the image surface of the document and converts the obtained scattered light into image density information, it is difficult for an image scanner to read the security image generated as a gloss image.

However, if there is a difference in the degree of smoothness of the surface of the image or the thickness of toner between the background portion and the foreground portion of the security image, there is a possibility that the difference in density between the background portion and the foreground portion can be detected depending on the performance of the image scanner. In addition, if the image is captured by a camera from a direction different from the direction perpendicular to the image surface, there is a possibility that the symbol or the like of the foreground portion can be relatively easily read.

In the following description, an image forming apparatus capable of forming an image that is more difficult to read by an image scanner and whose information is more difficult to exploit by a camera will be described.

Fourth Embodiment (1) Image Forming Apparatus

Figure 14:
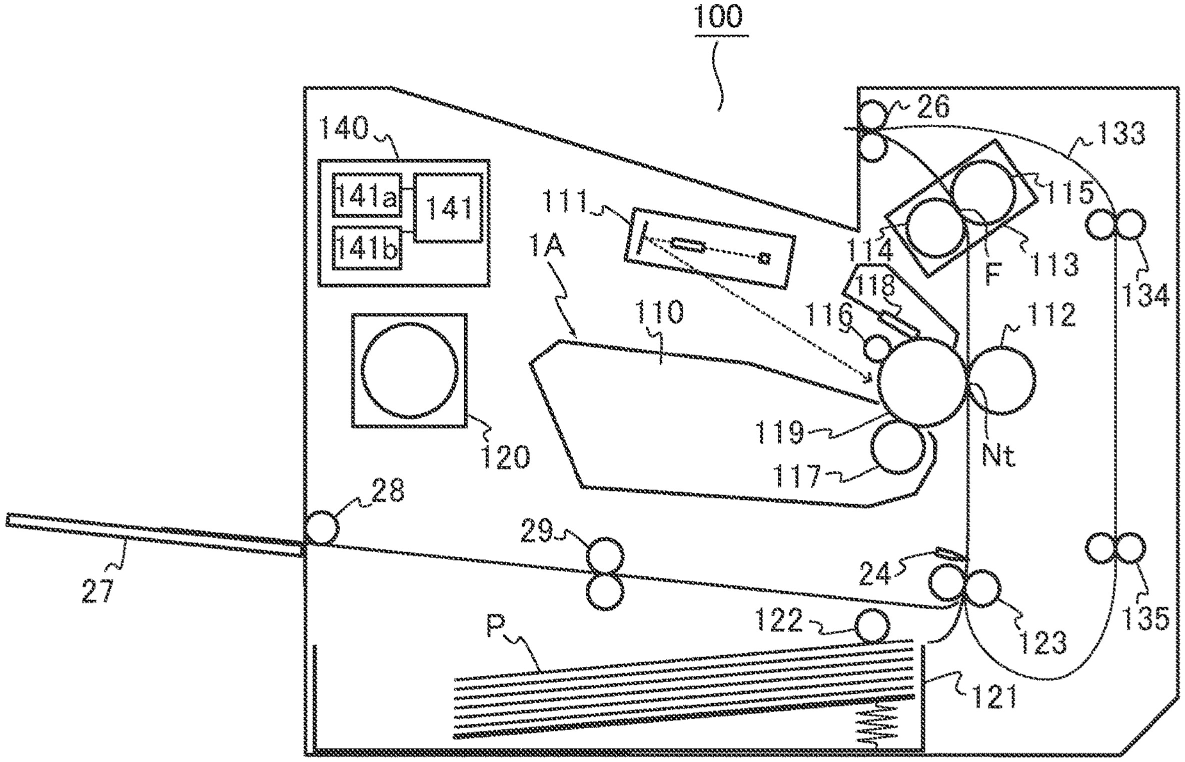
FIG. 14 is a schematic view of an image forming apparatus according to a fourth embodiment.

First, a configuration of an image forming apparatus 100 according to a fourth embodiment will be described with reference to FIG. 14. FIG. 14 is a schematic section view of the image forming apparatus 100 according to the fourth embodiment. The image forming apparatus 100 is a laser printer that forms an image on the recording material P by using an electrophotographic system.

The image forming apparatus 100 includes a process cartridge 110 including a photosensitive drum 119 that is an electrophotographic photosensitive member serving as an image bearing member, a charging roller 116 serving as a charging unit, a developing roller 117 serving as a developing unit, and a cleaning blade 118 serving as a cleaning unit. In the present embodiment, the photosensitive drum 119, the charging roller 116, the developing unit including the developing roller 117, and the cleaning unit including the cleaning blade 118 are configured as the process cartridge 110 attachable to and detachable from an apparatus body of the image forming apparatus 100. In addition, the image forming apparatus 100 includes a laser scanner 111, a feeding tray 121, a feeding roller 122, a conveyance roller pair 123, a top sensor 124, a transfer roller 112, a fixing unit 113 that is an image heating unit, a discharge roller pair 26, a motor 120, and a controller 140. An image forming portion 1A including the process cartridge 110, the laser scanner 111 serving as an exposing unit, and the transfer roller 112 serving as a transfer member functions as an image forming unit that forms a toner image on the recording material P.

The motor 120 is a driving unit for supplying a rotational driving force to the image bearing member and members that convey the recording material P. In the present embodiment, the motor 120 covers the rotational driving force of a plurality of members such as the feeding roller 122, the conveyance roller pair 123, the photosensitive drum 119, the fixing unit 113, and the discharge roller pair 26.

The photosensitive drum 119 is a photosensitive member formed in a drum shape, or a cylindrical shape, and is rotationally driven in a counterclockwise direction in FIG. 14 at a predetermined peripheral speed serving as a process speed during image formation. The charging roller 116 uniformly charges the circumferential surface of the photosensitive drum 119 to a predetermined polarity and potential. This will be referred to as primary charging. After the primary charging of the photosensitive drum 119, the charged surface is exposed to, or irradiated with, laser light emitted from the laser scanner 111 in a scanning manner. The laser scanner 111 serving as an exposing unit outputs laser light that is on/off modulated in accordance with a video signal transmitted from the controller 140. The video signal is generated on the basis of data obtained by spreading, in the main scanning direction and sub-scanning direction of the laser scanner 111, image information of an image to be formed on the image bearing member, and indicates a signal to be transmitted to the laser scanner 111 as a signal designating the amount of toner for each pixel. This signal is a time-series digital pixel signal. In addition, the image information indicating the image to be formed on the recording material P is input from an image scanner connected to the image forming apparatus 100 or from an external device that is an information processing terminal such as a computer.

By the exposure in a scanning manner by the laser scanner 111, electrical charges in an exposed region, or a light region, in the circumferential surface of the photosensitive drum 119 are removed, and an electrostatic latent image corresponding to the image information is formed on the circumferential surface of the photosensitive drum 119. The developing roller 117 bears developer containing toner on the surface thereof, and supplies toner to the photosensitive drum 119 to develop an electrostatic latent image formed on the circumferential surface of the photosensitive drum 119 into a toner image. In the present embodiment, a reversal development system in which toner is attached to the light region of the exposure for development is used.

The feeding tray 121 is attachable to and detachable from the image forming apparatus 100, and accommodates a stack of recording materials P therein. The recording materials P in the feeding tray 121 are fed one by one while being separated from each other as a result of the feeding roller 122 being driven on the basis of a feeding start signal from the controller 140, and are conveyed to the conveyance roller pair 123. The recording material P is further introduced into a transfer nip Nt serving as a transfer portion formed between the photosensitive drum 119 and the transfer roller 112 by the conveyance roller pair 123.

The top sensor 124 is disposed on a conveyance path between the conveyance roller pair 123 and the transfer nip Nt, and detects a timing at which the leading end of the recording material P delivered from the conveyance roller pair 123 passes the top sensor 124. The controller 140 adjusts the drawing start timing of the electrostatic latent image by the laser scanner 111 in accordance with the passage timing of the recording material P detected by the top sensor 124. That is, the drawing start timing is controlled such that the leading end portion of the toner image on the photosensitive drum 119 reaches the transfer nip Nt when the leading end portion of the recording material P reaches the transfer nip Nt.

The recording material P introduced into the transfer nip Nt is nipped and conveyed by the photosensitive drum 119 and the transfer roller 112 in the transfer nip Nt. During this, a transfer voltage controlled to a predetermined voltage value is applied to the transfer roller 112 from an unillustrated transfer voltage application power source. The transfer voltage of an opposite polarity to the normal charging polarity of the toner is applied to the transfer roller 112, and thus the toner image borne on the circumferential surface of the photosensitive drum 119 is electrostatically transferred onto the surface of the recording material P. The recording material P onto which the toner image has been transferred is conveyed to the fixing unit 113 from the transfer nip Nt. To be noted, transfer residual toner, paper dust, and the like on the circumferential surface of the photosensitive drum 119 having passed the transfer nip Nt are removed by the cleaning blade 118, and the circumferential surface of the photosensitive drum 119 is subjected to next image formation by going through the primary charging again.

The fixing unit 113 includes a fixing film 114 serving as a fixing member and a pressurizing roller 115 serving as a pressurizing member, and nips and conveys the recording material Pin a fixing nip F. The details of the fixing film 114 and the pressurizing roller 115 will be described later. During this, the toner image on the recording material P is heated by the fixing film 114 controlled to a predetermined fixing temperature, and is thus fixed to the recording material P. The recording material P having passed through the fixing unit 113 is discharged onto a discharge tray provided in an upper portion of the image forming apparatus 100 by the discharge roller pair 26 that discharges the recording material P, and is thus supported on the discharge tray. As a result of the series of operations described above, image formation on one recording material P is completed.

To be noted, in the case of duplex printing, the recording material P on a first surface of which an image has been formed by passing through the transfer nip Nt and the fixing nip F is delivered to the discharge roller pair 26, and is then pulled back into the image forming apparatus 100 as a result of the discharge roller pair 26 rotating in a reverse direction at a predetermined timing. The recording material P that has been pulled back is conveyed again to the image forming portion 1A in a state in which the first surface and a second surface thereof opposite to the first surface are swapped, by duplex conveyance roller pairs 134 and 135 provided in a duplex conveyance path 133. Then, the recording material P on the second surface of which an image has been formed by being conveyed through the transfer nip Nt and the fixing nip F again from the conveyance roller pair 123 is discharged onto the discharge tray by the discharge roller pair 26. That is, the duplex conveyance path 133 functions as a re-conveyance portion that conveys the recording material having passed through the image forming unit and the fixing unit again to the image forming unit or the fixing unit. In addition, in the present embodiment, the discharge roller pair 26 functions as an inversion unit that conveys the recording material to the re-conveyance portion in an inverted state.

By repeating the operation described above, image formation can be performed on a plurality of recording materials P one after another. To be noted, the image forming apparatus 100 of the present embodiment is capable of printing 43 black-and-white images per minute on a plain paper sheet of an A4 size [210 mm×297 mm] at a conveyance speed of 230 mm/sec.

The controller 140 includes a CPU 141, a ROM 141*a*, and a RAM 141*b*. The CPU 141 executes various programs stored in the ROM 141*a*, and thus controls various operations related to image formation while using the RAM 141*b* as a work area. The CPU 141 controls an image forming operation for forming an image including a gloss image serving as a security mark that will be described later on a recording material. The ROM 141*a* is an example of a non-transitory storage medium storing a control program of the image forming apparatus 100.

(2) Fixing Unit

Figure 15:
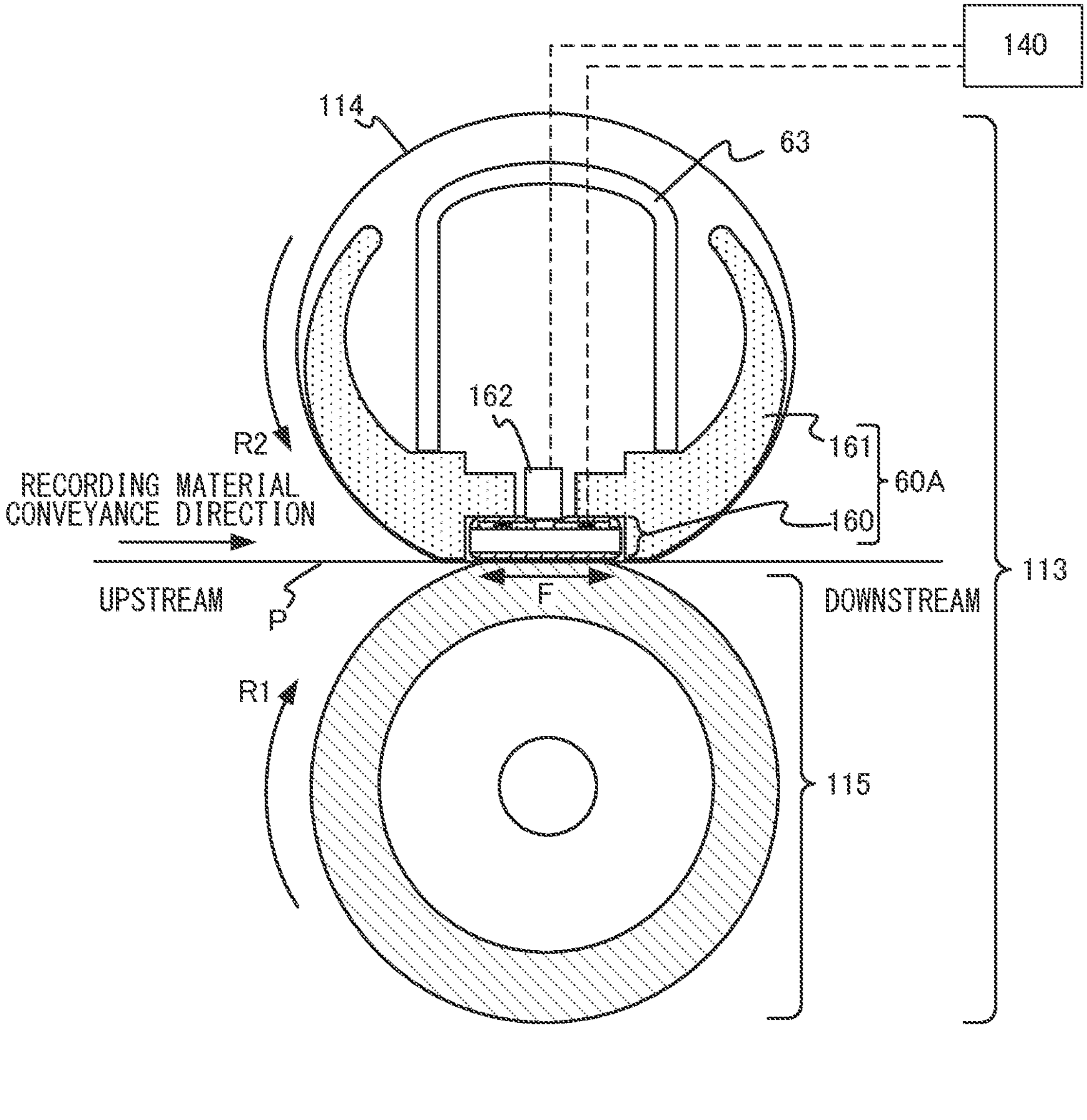
FIG. 15 is a schematic view of a fixing unit according to the fourth embodiment.

Next, a configuration of the fixing unit 113 will be described with reference to FIG. 15. FIG. 15 is a schematic diagram illustrating a sectional configuration of the fixing unit 113 according to the fourth embodiment. The fixing unit 113 includes the fixing film 114, the pressurizing roller 115, a nip forming member 60A including a heater 160 serving as a heat generating member and a heater holder 161, and a pressurizing stay 63.

The fixing film 114 is a flexible member formed in a tubular film shape, that is, an endless film shape. The heater 160 is a plate-shaped heat generating member that quickly heats the fixing film 114 while in contact with the inner circumferential surface of the fixing film 114. The heater 160 includes a heat generating resistor that generates heat when power is supplied thereto, and generates heat when a current is supplied thereto from a current circuit included in the image forming apparatus 100. The temperature of the heater 160 is detected by a thermistor 162 serving as a temperature detection unit that is in contact with the back surface of the substrate. Further, the controller 140 controls power supply to the heater 160 on the basis of a detection signal from the thermistor 162 such that the heater 160 is at a predetermined target temperature.

The heater holder 161 holds the heater 160. That is, the heater 160 and the heater holder 161 function as the nip forming member 60A that includes a heat generating member configured to heat the film and is disposed on the inner circumferential side of the film. The pressurizing stay 63 is constituted by a stiff member such as metal, and applies a pressurizing force received from an unillustrated pressurizing member such as a spring to the pressurizing roller 115 via the heater holder 161. As a result of this pressurizing force, a fixing nip F is formed as a nip portion of a predetermined width between the nip forming member 60A and the pressurizing roller 115 in pressure contact with each other with the fixing film 114 therebetween.

To be noted, although the heater 160 is in direct contact with the inner circumferential surface of the fixing film 114 in the fixing unit 113 of the present embodiment, a plate-shaped or sheet-shaped member having high thermal conductivity may be disposed between the heater 160 and the fixing film 114. Examples of this member include a sheet-shaped member formed from ferroalloy or aluminum. That is, a nip forming member 60A in which the heater 160 heats the fixing film 114 via a sliding member that slides on the inner circumferential surface of the fixing film 114 may be used.

(3) Method for Applying Security Image

Figure 16A:
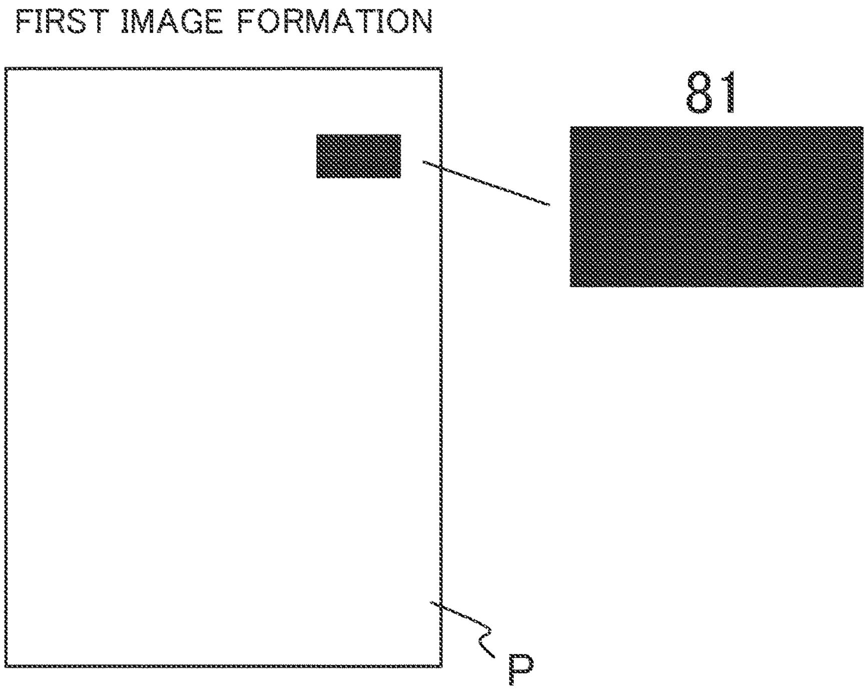
FIGS. 16A and 16B are each a schematic diagram illustrating a procedure for applying a security image according to the fourth embodiment.
Figure 16B:
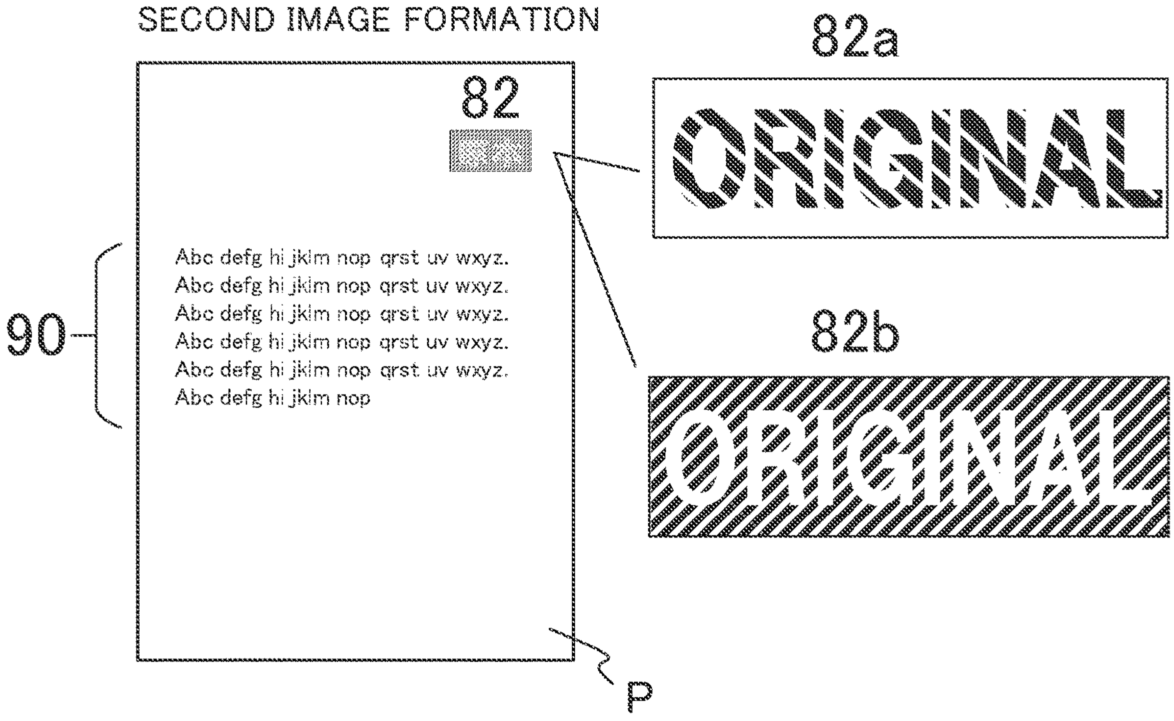

A method for applying a security image serving as a security mark for forgery prevention in the present embodiment will be described with reference to FIGS. 16A, 16B, and 17. FIGS. 16A and 16B are schematic diagrams illustrating a procedure for applying the security mark on the recording material P. In addition, FIG. 17 is a perspective view illustrating a cross-section of the security mark applied on the recording material P.

Figure 17:
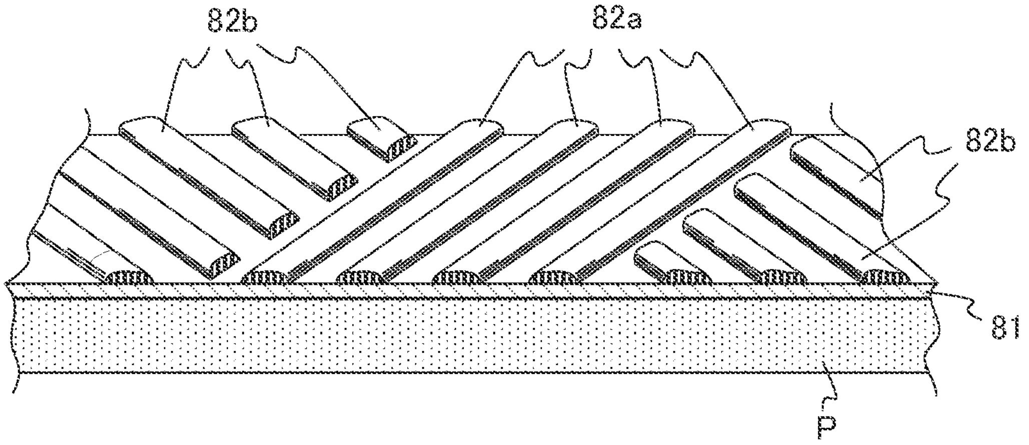
FIG. 17 is a perspective view illustrating a cross-section of the security image according to the fourth embodiment.

As illustrated in FIGS. 16A, 16B, and 17, the security mark of the present embodiment is constituted by a base image 81 that is in direct contact with the recording material P, and a surface image 82 formed on the base image 81. The surface image 82 is constituted by a foreground image 82*a* serving as a first halftone image, and a background image 82*b* serving as a second halftone image.

When an instruction to form an image including a security mark is received, the image forming apparatus 100 first forms the base image 81 as illustrated in FIG. 16A. The base image 81 is an image of a uniform density and has a size large enough to include therein the surface image 82 that is to be formed later. In the present embodiment, an image of density data 100%, that is, a so-called solid image as the base image 81 is formed at a conveyance speed of 230 mm/sec, which is a process speed of image formation of the base image.

When image formation of the base image 81 is finished, the image forming apparatus 100 enables, by using the duplex conveyance path 133 as follows, forming an image again on the surface on which the base image 81 has been formed. This surface will be hereinafter referred to as an image surface. That is, the recording material P to which the base image 81 has been fixed in the fixing unit 113 is, after being delivered to the discharge roller pair 26, pulled back into the image forming apparatus 100 as a result of the discharge roller pair 26 rotating in a reverse direction at a predetermined timing. The recording material P that has been pulled back is conveyed to the conveyance roller pair 123 by the duplex conveyance roller pairs 134 and 135 provided in the duplex conveyance path 133, and is conveyed in a state in which a second surface of the recording material P, that is, a surface opposite to the image surface of the base image 81 opposes the photosensitive drum 119. At this time, image formation is not performed on the second surface of the recording material P. The recording material P conveyed to the discharge roller pair 26 from the conveyance roller pair 123 via the transfer nip Nt and the fixing nip F is pulled back again into the image forming apparatus 100 as a result of the discharge roller pair 26 rotating in a reverse direction at a predetermined timing. The recording material P that has been pulled back is conveyed to the conveyance roller pair 123 by the duplex conveyance roller pairs 134 and 135 provided in the duplex conveyance path 133, and takes a state in which a first surface of the recording material P, that is, the image surface of the base image 81 opposes the photosensitive drum 119. That is, it becomes possible for the image forming portion 1A to form a toner image again on the same surface of the recording material P as the surface on which the base image 81 is already formed.

Next, the surface image 82 is formed as illustrated in FIG. 16B. The surface image 82 is formed on or transferred onto the base image 81 that has been already formed. At this time, the conveyance speed of the recording material P, that is, the process speed for image formation of the surface image 82 is set to 77 mm/sec.

As illustrated in FIG. 16A, the surface image 82 is constituted by the foreground image 82*a* and the background image 82*b*. The foreground image 82*a* is an image expressing a specific character, symbol, figure, pattern, or the like indicating the information as the security mark by a halftone constituted by an anisotropic pattern serving as a first pattern. This image serves as a first halftone image. As the anisotropic halftone, a group of parallel lines having a line thickness of 250 μm and a line pitch of 250 μm is employed.

The foreground image 82*a* includes, as specific characters, two characters of a string “ORIGINAL”. That is, the security mark as a gloss image of the present embodiment including the base image 81 and the surface image 82 is a mark guaranteeing that the recording material on which the gloss image is formed is an original. To be noted, “ORIGINAL” is an example of information indicated by the gloss image, and may be a different string, symbol, figure, or the like in accordance with the use purpose of the gloss image.

The background image 82*b* is formed in a region in the region where the base image 81 is formed excluding the region where the foreground image 82*a* is formed. That is, the image region of the foreground image 82*a* serving as a first region and the image region of the background image 82*b* serving as a second region are exclusive to each other, and these two image regions substantially cover the entirety of the image region of the base image 81. That is, the background image 82*b* of the present embodiment is an image in which the region of the characters "ORIGINAL", which is the foreground image 82*a*, is blanked in the image region of the base image 81. In other words, the foreground image 82*a* corresponding to a first region and the background image 82*b* corresponding to a second region of the surface image 82 are exclusive to each other and adjacent to each other.

The background image 82*b* is an image constituted by a halftone that has different anisotropy than the halftone of the foreground image 82*a* and has the same density as the halftone of the foreground image 82*a*. This image serves as a second halftone image. As the halftone of the background image 82*b*, a group of parallel lines which has a line thickness of 250 μm and a line pitch of 250 μm and whose angle is different from the angle of the parallel line group of the foreground image 82*a* by 90° is employed. In addition, the parallel line group constituting the foreground image 82*a* and the parallel line group constituting the background image 82*b* each extend at an angle of 45° with respect to the conveyance direction of the recording material.

That is, in the present embodiment, the first halftone image is constituted by a pattern of a parallel line group extending in a first direction, and the second halftone image is constituted by a pattern of a parallel line group extending in a second direction crossing the first direction. In addition, the line thickness and line pitch of the parallel line group constituting the first halftone image are equal to the line thickness and line pitch of the parallel line group constituting the second halftone image.

The foreground image 82*a* and the background image 82*b* occupy regions complementary to each other by halftones of the same density as illustrated in FIG. 17. Therefore, the surface image 82 that is a sum of the foreground image 82*a* and the background image 82*b* is a halftone image that overall has a uniform density.

In addition, when forming the surface image 82, an image other than the security mark, that is, an image of so-called body text 90 is also formed. The recording material P onto which the surface image 82 and the body text 90 have been transferred and fixed is discharged onto a discharge tray on the image forming apparatus 100 through the discharge roller pair 26, and thus image formation is completed.

(4) Effects of Security Image

Effects of the security image serving as a security mark utilizing the gloss difference of the present embodiment will be described. The glossiness of an image depends on the intensity of reflection light from the surface of the image. The reflection light from the security mark of the present embodiment can be divided into a reflection light component from the base image 81 and a reflection light component from the surface image 82. Among these, the reflection light component from the base image 81 changes greatly depending on the angle of gaze of an observer as will be described below. The "reflection light" mentioned herein is reflection light that is mirror-reflected on a plane along the surface of the recording material P on which the security image is provided.

Figure 18A:
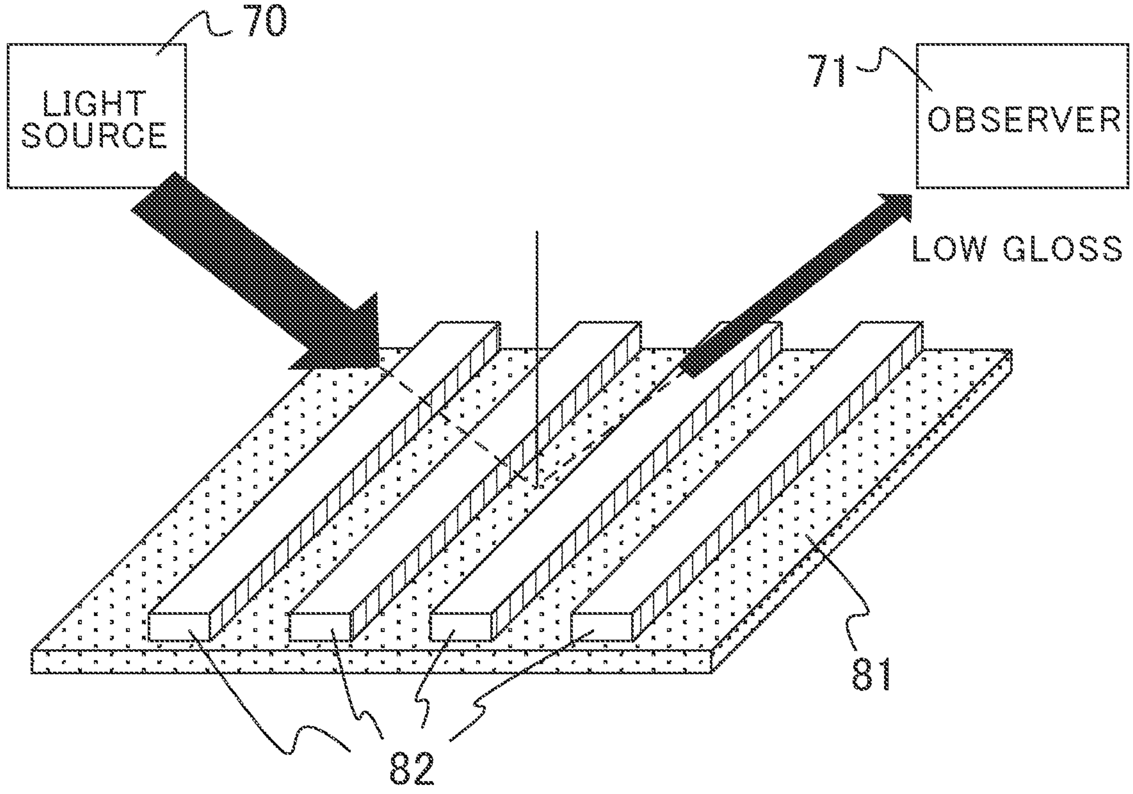
FIGS. 18A and 18B are each a diagram illustrating a relationship between an observation direction and a glossiness of the security image according to the fourth embodiment.
Figure 18B:
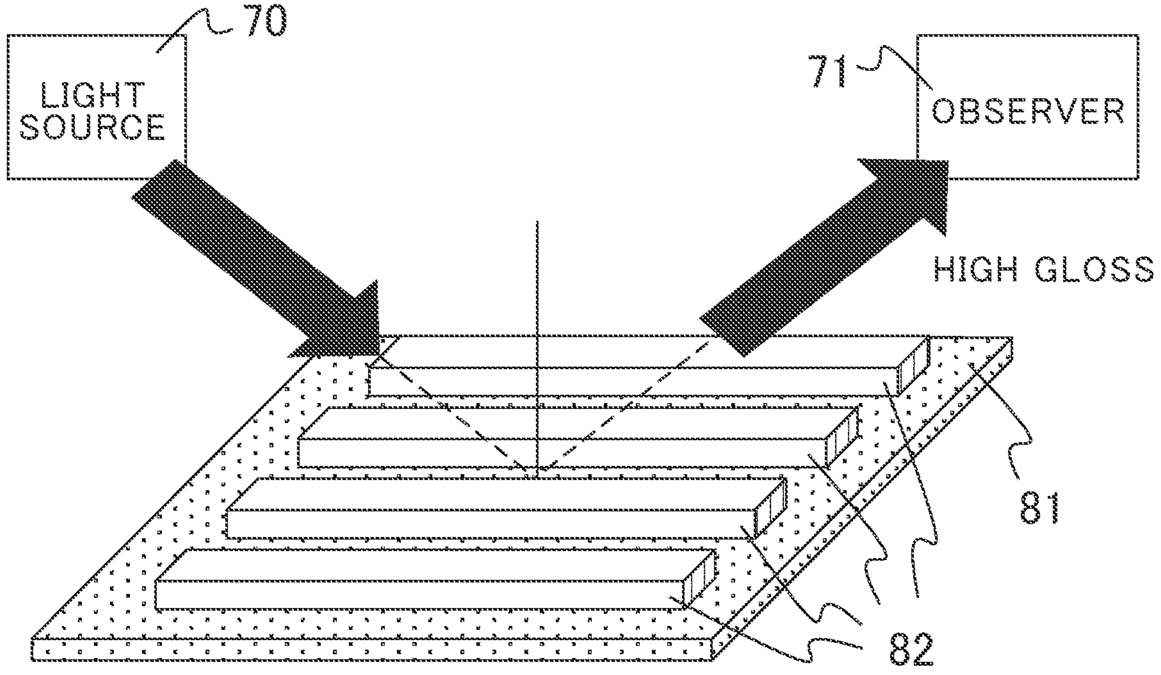

FIG. 18A illustrates an example of a state in which the line direction of the parallel line group of the surface image 82 is approximately perpendicular to a direction of an observation light source 70 as viewed from an observer 71. In addition, FIG. 18B illustrates an example of a state in which the line direction of the parallel line group of the surface image 82 is approximately parallel to the direction of the observation light source 70 as viewed from the observer 71. In the state of FIG. 18A, part of incident light from the observation light source 70 is blocked by the parallel line group of the surface image 82 and does not reach the base image 81. In addition, part of reflection light from the base image 81 is also blocked by the walls of the parallel line group of the surface image 82, that is, edges of lines constituting the surface image 82, and does not reach the observer 71. In contrast, in the state of FIG. 18B, not much of the light from the observation light source 70 is blocked by the parallel line group of the surface image 82. Therefore, in the state of FIG. 18B, the intensity of the reflection light that the observer 71 can observe is higher, and thus the gloss is higher than in the state of FIG. 18A.

Figure 19:
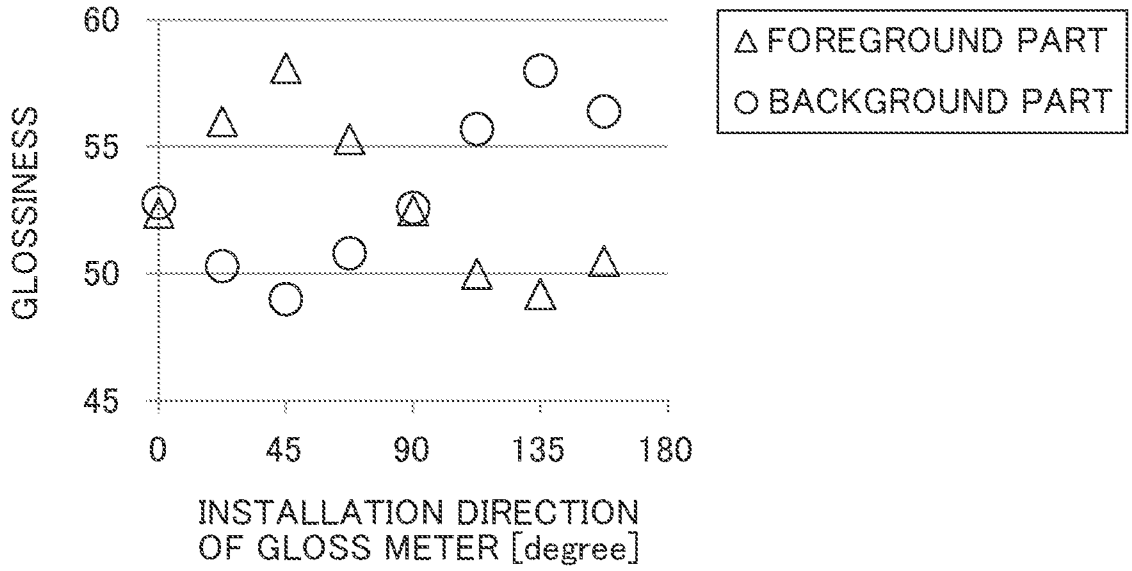
FIG. 19 is a graph illustrating measurement results of the glossiness of the security image according to the fourth embodiment.

FIG. 19 illustrates results of measurement of glossiness in the foreground image 82*a* part and the background image 82*b* part of the security mark. The recording material used in this measurement is "Futura 100 lb (manufactured by VERSO), grammage: 148 g/m$^2$". In addition, the glossiness is measured by using PG-1 manufactured by Nippon Denshoku Industries Co., Ltd. as the gloss meter while changing the installation direction of the gloss meter with respect to the conveyance direction of the recording material. The incident angle of the measurement light of the gloss meter on the surface of the recording material is set to 75°. To be noted, the parallel line group of the foreground image 82*a* and the parallel line group of the background image 82*b* used for this measurement are at an angle of 90° with respect to each other, and each extend at an angle of 45° with respect to the conveyance direction of the recording material.

The horizontal axis of the graph of FIG. 19 represents the installation direction of the gloss meter with respect to the conveyance direction of the recording material in terms of angle. When the installation direction of the gloss meter is 45°, the foreground image 82*a*, the gloss meter, and the light source are in the positional relationship illustrated in FIG. 18B, and the measured glossiness of the foreground image 82*a* is relatively high. In addition, the parallel line groups used in the foreground image 82*a* and the background image 82*b* of the present embodiment are in line directions different from each other by 90°. Therefore, when the installation direction of the gloss meter is 45°, the background image 82*b*, the gloss meter, and the light source are in the positional relationship illustrated in FIG. 18A, and the measured glossiness of the background image 82*b* is relatively lower than that of the foreground image 82*a*.

Similarly, When the installation direction of the gloss meter is 135°, the foreground image 82*a*, the gloss meter, and the light source are in the positional relationship illustrated in FIG. 18A, and the background image 82*b*, the gloss meter, and the light source are in the positional relationship illustrated in FIG. 18B. Therefore, the measured glossiness of the background image 82*b* is relatively higher than that of the foreground image 82*a*.

As described above, in the security mark of the present embodiment, the glossiness of the foreground image 82*a* and the background image 82*b* changes depending on the observing angle. According to the experiment conducted by the inventors, it has been found that the information of the security mark, that is, the characters of "ORIGINAL" are easily visually recognizable when the difference in the glossiness between the foreground image 82*a* and the background image 82*b* is 4° or more. That is, practical visibility of the security mark can be secured in the case where, for at least one measurement angle, the difference between the 75° specular glossiness of a region of the first halftone image measured from the measurement angle by the gloss meter and the 75° specular glossiness of a region of the second halftone image measured from the measurement angle by the gloss meter is 4° or more.

In addition, the information of the security mark of the present embodiment has the highest visual recognizability in the case of a gaze angle corresponding to the installation angle of 45° or 135° of the gloss meter of FIG. 19, and the visual recognizability decreases when the gaze angle deviates from this state. Particularly, in the case where the security mark is observed diagonally from 45° with respect to the line direction of the parallel line group, which corresponds to the installation angle of the gloss meter of FIG. 19 of 0° or 90°, or in the case where the security mark is observed from a direction perpendicular to the image surface, there is no gloss difference between the foreground image 82*a* and the background image 82*b*. Therefore, it is difficult to read the information of the security mark in the case where the security mark is observed from these angles.

Here, in the case where the recording material P is held by a hand or the viewpoint of the observer can be freely changed, the information of the security mark can be read relatively easily by adjusting the gaze angle such that the visual recognizability increases. In contrast, in the case of a fixed camera whose gaze angle cannot be adjusted, the angle from which the information can be read is limited, and therefore information exploitation can be suppressed.

However, as described above, since the foreground image 82*a* and the background image 82*b* occupy regions complementary to each other by halftones of the same density, the security mark is an image having an overall uniform density. Therefore, it is difficult to read the information of the security mark by reading the image by an image scanner, and therefore this is effective from the viewpoint of forgery prevention.

Further, in the present embodiment, the recording material P is conveyed again to the fixing unit 113 after the base image 81 has been subjected to the fixing process once, then the recording material P has been conveyed again through the duplex conveyance path 133, and the surface image 82 has been formed thereon. Therefore, the base image 81 is subjected to the fixing process a plurality of times, and thus the surface thereof is smoother. Therefore, as compared with an image having gone through the fixing process only once as in normal printing, the image is more likely to specularly reflect the light from the light source. As a result of this, the gloss difference between the foreground image 82*a* and the background image 82*b* according to the gaze angle becomes more noticeable, and thus the information of the security mark is more visually recognizable.

Fifth Embodiment

Next, a fifth embodiment will be described. According to the present embodiment, a more preferable security mark can be generated by adjusting the toner amount of the base image 81 in accordance with the type of the recording material P. The configuration of the image forming apparatus and the basic operation for adding the security image to the recording material P are substantially the same as in the fourth embodiment, and therefore the description thereof will be omitted.

For example, cases where "Futura 100 lb (manufactured by VERSO), grammage: 148 g/m$^2$" and "GF-0081 (Canon Marketing Japan), grammage: 81.4 g/m$^2$" are used will be described. In the case of using "Futura 100 lb", the base image 81 is formed as a solid image of density data 100% as in the fourth embodiment. In contrast, in the case of using "GF-C-081", the toner amount of the base image 81 is set to 1.5 times of the solid image of the fourth embodiment. At this time, the toner amount is increased by supplying more toner to the circumferential surface of the photosensitive drum 119 than in the normal image forming operation by increasing the rotational speed of the developing roller 117.

Figure 20:
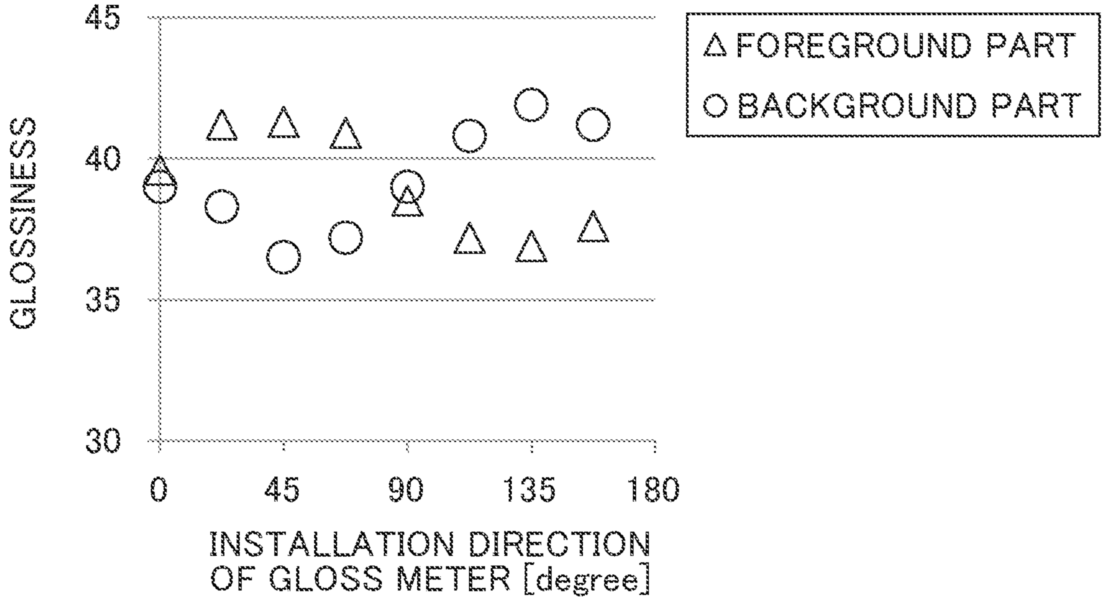
FIG. 20 is a graph illustrating measurement results of the glossiness of a security image according to a fifth embodiment.
Figure 21:
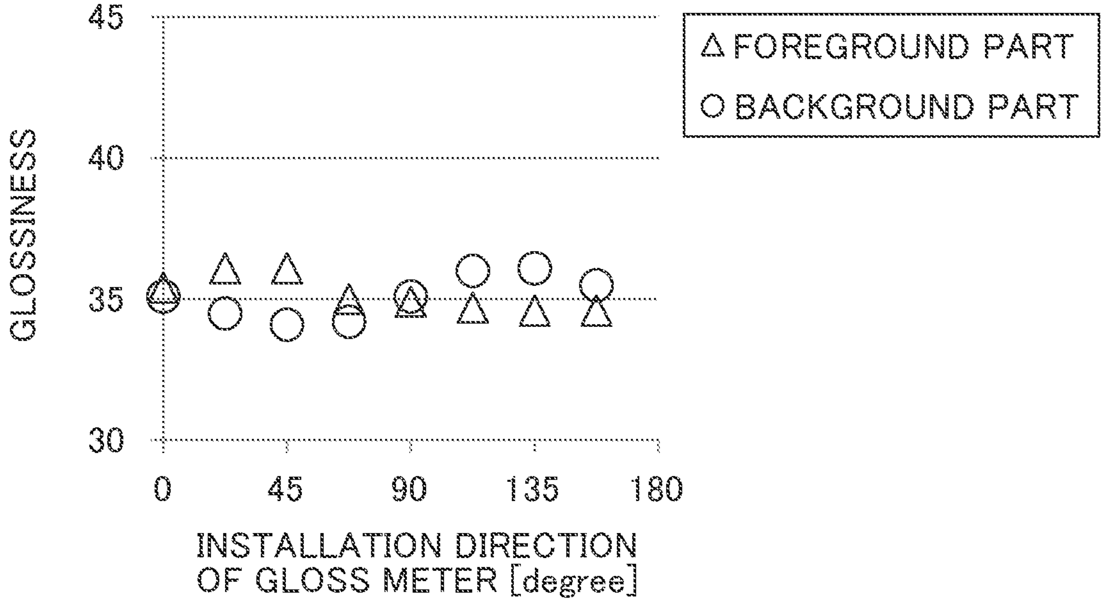
FIG. 21 is a graph illustrating measurement results of the glossiness of a security image according to a comparative example.

FIG. 20 illustrates the results of measurement of the glossiness of the foreground image 82*a* part and the background image 82*b* part of the security mark in the case of using "GF-0081" as the recording material P. In addition, as Comparative Example 1, measurement results of the glossiness in the case where "GF-0081" is used as the recording material P, and a solid image of density data 100% is formed as the base image 81 are illustrated in FIG. 21. Here, the density data 100% indicates the signal value of the video signal for causing the laser scanner 111 to form an image of the maximum density as the normal image other than the security mark, that is, the body text. The image formed on one surface of the recording material P on the basis of the video signal of the density data 100% is a solid image whose toner coverage, that is, image coverage in the area on the recording material P is 100%. In contrast, the 1.5-time base image 81 used in the present embodiment is an image whose toner deposition amount per unit area on the recording material P is 1.5 times of the image of the image coverage of 100% formed with the density data 100%.

In Comparative Example 1, the difference in the glossiness between the foreground image 82*a* and the background image 82*b* is at most 2° as illustrated in FIG. 21, which is a small value. This is because due to the surface roughness of "GF-0081" being higher than that of "Futura 100 lb", the surface of the base image 81 formed on the recording material P is relatively rough. Since the surface of base image 81 is rough, the light from the light source is less likely to be specularly reflected, and thus the gloss difference between the foreground image 82*a* and the background image 82*b* depending on the gaze angle is less likely to be generated. Therefore, in Comparative Example 1 in which the toner amount of the base image 81 is set to 100% regardless of the type of the recording material, it may be difficult to visually recognize the information of the security mark, that is, the characters of "ORIGINAL".

In the fifth embodiment, the difference in the glossiness between the foreground image 82*a* and the background image 82*b* is at most 5° as illustrated in FIG. 20, which is larger than in Comparative Example 1. This is because by increasing the toner amount of the base image 81 and covering the recesses and protrusions of the surface of the recording material P, the surface of the base image 81 is smoother than in Comparative Example 1. Similarly to the fourth embodiment, the glossiness of the foreground image 82*a* and the background image 82*b* changes according to the observation angle, and the information of the security mark, that is, the characters of "ORIGINAL" can be visually recognized as the difference in the glossiness.

As described above, in the present embodiment, in the case of applying the same security mark on a first recording material and a second recording material having higher surface roughness than the first recording material, the toner amount of the base image 81 to be applied on the second recording material is set to be larger than the toner amount of the base image 81 to be applied on the first recording material. As a result of this, a security mark that is easily visually recognizable can be applied in accordance with the material nature of the recording material. In addition, as compared with a case of always setting the toner amount of the base image 81 to 1.5 times of the fourth embodiment, the amount of toner consumption and energy consumption in image formation can be reduced because the toner amount of the base image 81 is not increased for a recording material whose surface is relatively smooth.

To be noted, ten-point mean roughness, arithmetic mean roughness, and the like are known as representative scales of the surface roughness of the recording material P, and, in any scale, the glossiness in the case of forming a solid image at density data 100% is lower when the surface roughness is higher, that is, the surface is rougher. Therefore, for example, increasing the toner amount of the base image 81 on a recording material whose ten-point mean roughness is equal to or larger than a threshold value as compared with a case where the ten-point mean roughness is less than the threshold value can be considered. However, the configuration is not limited to this, and a different surface roughness value may be used as the standard. In addition, in the control program executed by the controller 140 of the image forming apparatus 100, the toner amount of the base image 81 does not have to be changed on the basis of the value of the surface roughness. For example, a table in which the toner amount is determined in advance in accordance with attributes of the recording material may be referred to. Examples of the attributes include brands and types of sheets such as whether or not the recording material is a plain paper sheet or a coated paper sheet.

Other Embodiments

The present technique can be also applied to an image forming apparatus including a plurality of process units serving as a plurality of developing units, which is typically known as a color image forming apparatus. In the color image forming apparatus, the toner amount of the base image 81 can be increased by using the plurality of process units. For example, in a color image forming apparatus including four process units of yellow, magenta, cyan, and black, the base image 81 of a toner amount of 200% in total of 100% of cyan and 100% of black can be formed. By increasing the toner amount of the base image 81, the surface of the base image 81 can be smoother, and thus light from the observation light source is more likely to be specularly reflected. Therefore, the gloss difference between the foreground image 82*a* and the background image 82*b* depending on the gaze angle becomes more noticeable, and thus a security mark that is more easily visually recognizable can be applied. The toner color is not limited to those described above, and for example, the base image 81 or the surface image 82 may be formed from clear toner or white toner.

In addition, in the color image forming apparatus, it is also possible to form the base image 81 and the surface image 82 so as to be superimposed on each other in one image forming operation by using the plurality of process units serving as a plurality of developing units. That is, the base image 81 is formed by a process unit that forms a toner image to be positioned in a lower layer in a state of having been transferred onto the recording material, and the surface image 82 is formed by a process unit that forms a toner image to be positioned in a surface layer in a state of having been transferred onto the recording material. Further, by performing the fixing process by the fixing unit 113 on the recording material onto which the base image 81 and the surface image 82 have been transferred, the fixing process of the base image 81 and the surface image 82 can be simultaneously performed. In this case, only one fixing process by the fixing unit 113 needs to be performed, and thus the productivity for image formation can be improved. To be noted, examples of the system of the color image forming apparatus include a system in which a plurality of process units are arranged along an intermediate transfer member such as an intermediate transfer belt, and a system in which process units of a direct transfer system are arranged along a conveyance path for the recording material.

In addition, although an example in which a parallel line group whose angle is different from the parallel lines of the foreground image 82*a* by 90° is employed as the background image 82*b* has been described in the embodiment described above, the angle difference between the parallel line groups does not have to be 90°. Further, although the surface image 82 is constituted by two halftone images of the foreground image 82*a* and the background image 82*b*, the surface image 82 may be constituted by three or more types of halftone images as long as the halftone images have different anisotropy and have the same density. For example, the surface image 82 can be constituted by halftone images constituted by three parallel line groups whose relative angles with respect to each other are 60° and 120°.

Figure 22A:
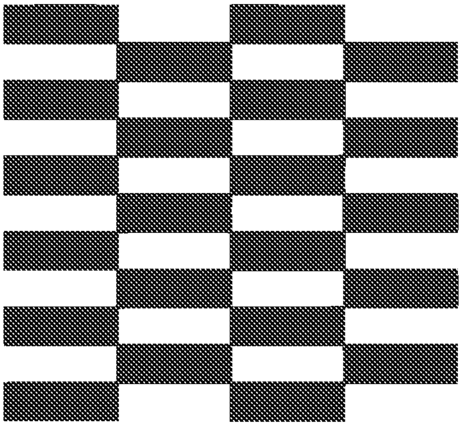
FIGS. 22A to 22C are each a diagram illustrating a modification example of a halftone pattern used for a security image.
Figure 22B:
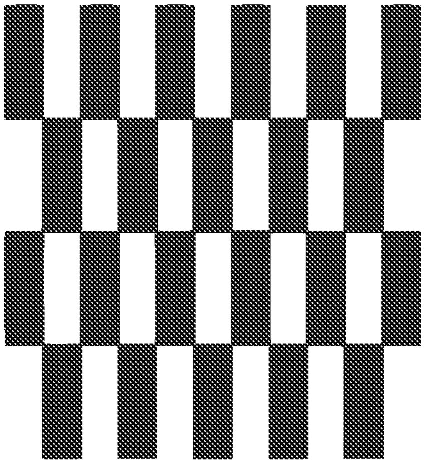
Figure 22C:
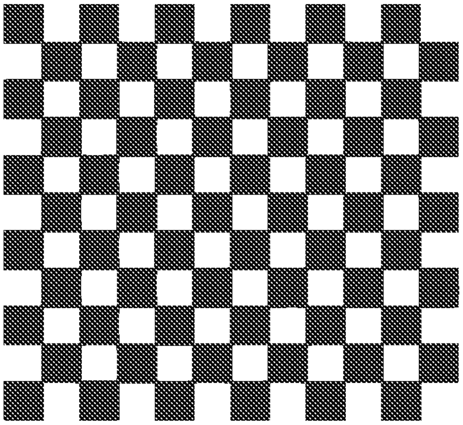

In addition, the foreground image 82*a* and the background image 82*b* are not limited to the parallel line group pattern described in the fourth embodiment as long as the two have approximately the same density and have different anisotropy. For example, a halftone image of a pattern of FIG. 22A may be employed as the foreground image 82*a*, and a halftone image of a pattern of FIG. 22B may be employed as the background image 82*b*. In addition, these two images do not have to be the same pattern with different angles, and for example, the two images may be a combination of a parallel line group pattern and the pattern of FIG. 22A. In addition, either one of the foreground image 82*a* and the background image 82*b* may be an isotropic pattern as illustrated in FIG. 22C as long as the densities of the two images are approximately the same. That is, it suffices as long as at least one of the first halftone image and the second halftone image is constituted by an anisotropic pattern, and the difference between the glossiness of the region of the first halftone image and the glossiness of the region of the second halftone image changes depending on the angle in which the gloss image is viewed.

Here, the "anisotropy" of a pattern constituting a halftone image refers to a state in which, in the case of cutting the pattern along a straight line in a certain direction, the frequency of appearance of boundaries (edges) between a toner image region and a non-toner image region varies depending on the cutting direction. This is because, if the appearance frequency of the edges of the pattern is high in the case where the pattern is cut in a certain direction, the proportion of light reflected in a direction different from the specular reflection direction at the edge portion when the image is viewed from that direction and the proportion of incident light that is blocked by the pattern and does not reach the base image increase, and therefore the glossiness decreases. In addition, if the appearance frequency of the edges of the pattern is low in the case where the pattern is cut in a different direction, the proportion of light reflected in a direction different from the specular reflection direction at the edge portion when the image is viewed from that direction and the proportion of incident light that is blocked by the pattern and does not reach the base image decrease, and therefore the glossiness increases. The appearance frequency of edges in the case where the pattern illustrated in FIG. 22A is cut in a direction along the pattern (i.e., horizontal direction in FIG. 22A) is lower than the appearance frequency of edges in the case where the pattern illustrated is cut in a direction perpendicular to the pattern (i.e., vertical direction in FIG. 22A), and therefore the glossiness is higher in the case where the pattern is viewed from the direction along the pattern than in the case where the pattern is viewed from the direction perpendicular to the pattern.

In addition, although reading information by an image scanner is suppressed by setting the density of the foreground image 82*a* and the background image 82*b* to be equal in the image data in the embodiments, the density does not have to be completely equal. That is, it suffices as long as the difference between the density of the first halftone image and the density of the second halftone image is equal to or smaller than a predetermined threshold value. This will be described with reference to Table 1.

TABLE 1

| COLOR DIFFERENCE ΔE2000 | DIFFICULTY TO READ BY IMAGE SCANNER |
|---|---|
| 0.5 | A |
| 1.1 | A |
| 1.2 | B |
| 2.0 | B |
| 3.0 | B |
| 3.1 | F |
| 5.0 | F |

Table 1 indicates a relationship between a color difference ΔE2000 of CIE L*a*b* value when the foreground image 82*a* and the background image 82*b* are changed and how difficult reading the information of the security mark by an image scanner at that time. A is given to a security mark whose information was not read by an image scanner, and F is given to a security mark whose information was read by the image scanner. In addition, B is given to a case where special settings such as adjusting the Gamma value were required to read the information. That is, if the color difference ΔE2000 of CIE L*a*b* value between the foreground image 82*a* and the background image 82*b* is 3.0 or smaller, reading of the information by the image scanner can be made difficult, which is effective from the viewpoint of forgery prevention. That is, 3.0 serves as the predetermined threshold value herein. To be noted, the threshold value 3.0 of the color difference ΔE2000 is merely an example of a predetermined threshold value for suppressing reading by an image scanner, and a different scale and a different value may be used for the threshold value as long as reading by the image scanner can be effectively suppressed.

In addition, although an example in which the base image 81 and the surface image 82 are successively formed by conveying the recording material P through the duplex conveyance path 133 has been described in the embodiments described above, the base image 81 and the surface image 82 may be formed separately. For example, a configuration in which a recording material P to which the base image 81 has been fixed in the fixing unit 113 is temporarily discharged onto the discharge tray on the image forming apparatus 100, and then the recording material P is fed again through a manual feed tray 27 to form the surface image 82 thereon may be employed.

In addition, although a security mark guaranteeing that the document or the like is original has been described as an example of the gloss image including meaningful information indicated by gloss, the use of the gloss image is not limited to this. For example, the gloss image may be the main content of the document or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2021-074202, filed on Apr. 26, 2021, and 2021-074203, filed on Apr. 26, 2021, which are hereby incorporated by reference herein in their entirety.

What is claimed is:

1. An image forming apparatus comprising:

an image forming unit configured to form a toner image on a recording material;

a fixing unit configured to fix the toner image formed on the recording material by the image forming unit to the recording material; and a controller configured to cause the image forming unit to form an image on a basis of image information, the controller being configured to cause the image forming unit to form the image in which a first toner image and a second toner image are superimposed on each other on the recording material, the first toner image being a toner image corresponding to the image information, the second toner image being formed from pigmented toner and constituted by a pattern having anisotropy such that glossiness of the image changes depending on a direction in which the image is viewed, wherein, in the pattern constituting the second toner image, parallel lines extending in the same direction are arranged at a predetermined pitch, wherein the controller is configured to change a level of a decorative effect by changing thickness and pitch of the parallel lines constituting the second toner image, and wherein the controller is configured to designate a value of the thickness of the parallel lines from a plurality of levels and a value of the pitch of the parallel lines from a plurality of levels.

2. The image forming apparatus according to claim 1, wherein the glossiness of the image as viewed in a direction along the parallel lines is higher than the glossiness of the image as viewed in a direction perpendicular to the parallel lines.

3. The image forming apparatus according to claim 1, wherein the second toner image is a toner image in which a first pattern and a second pattern are superimposed on each other, wherein parallel lines extending in a first direction are arranged at a predetermined first pitch in the first pattern, and wherein parallel lines extending in a second direction different from the first direction are arranged at a predetermined second pitch in the second pattern.

4. The image forming apparatus according to claim 1, wherein the controller is configured to select a pattern from a plurality of patterns each constituted by a group of parallel lines extending in the same direction and use the selected pattern as the pattern constituting the second toner image, and wherein a direction in which the group of parallel lines extend is different for each pattern of the plurality of patterns.

5. The image forming apparatus according to claim 1, wherein the first toner image is an image in which toner is applied at a uniform thickness in entirety of a region where the first toner image and the second toner image overlap with each other.

6. The image forming apparatus according to claim 1, wherein the first toner image and the second toner image are formed from toner of the same color.

7. The image forming apparatus according to claim 1, wherein the controller is configured to selectively execute a first mode in which the image forming unit forms the first toner image and the second toner image, and a second mode in which the image forming unit forms a toner image corresponding to the image information without forming the second toner image.

8. The image forming apparatus according to claim 1, further comprising a re-conveyance portion configured to convey the recording material having passed the fixing unit again to the image forming unit, wherein the controller is configured to:

cause the image forming unit to form the first toner image on the recording material;

cause the re-conveyance portion to convey the recording material having passed the fixing unit again to the image forming unit; and cause the image forming unit to form the second toner image on the recording material.

9. The image forming apparatus according to claim 8, wherein the controller is configured to, after the second toner image is formed on the recording material:

cause the fixing unit to fix the second toner image to the recording material;

cause the re-conveyance portion to convey the recording material again to the fixing unit; and cause the fixing unit to further fix the second toner image.

10. The image forming apparatus according to claim 1, wherein the image forming unit includes:

a first image bearing member configured to bear a toner image;

a second image bearing member configured to bear a toner image; and a transfer unit configured to transfer toner images from the first image bearing member and the second image bearing member onto the recording material, and wherein the controller is configured to:

cause the image forming unit to form the first toner image on the first image bearing member and form the second toner image on the second image bearing member;

cause the transfer unit to simultaneously transfer the first toner image and the second toner image onto the recording material; and cause the fixing unit to simultaneously fix the first toner image and the second toner image to the recording material.

11. An image forming apparatus comprising:

an image forming unit configured to form a toner image on a recording material;

a fixing unit configured to fix the toner image formed on the recording material by the image forming unit to the recording material; and a controller configured to cause the image forming unit to form an image including a base image and a surface image superimposed on the base image, wherein the surface image includes a first halftone image and a second halftone image, wherein a first region where the first halftone image is formed and a second region where the second halftone image is formed are exclusive to each other and adjacent to each other, wherein the first halftone image is constituted by an anisotropic pattern such that difference between glossiness of the image in the first region and the glossiness of the image in the second region changes depending on a direction in which the image is viewed, and wherein difference between density of the image in the first region and the density of the image in the second region is equal to or smaller than a predetermined threshold value.

12. The image forming apparatus according to claim 11, wherein the second halftone image is constituted by a pattern having different anisotropy from the first halftone image.

13. The image forming apparatus according to claim 11, wherein the second halftone image is constituted by an isotropic pattern.

14. The image forming apparatus according to claim 11, wherein the first halftone image is constituted by a pattern constituted by a group of parallel lines each extending in a first direction, and wherein the second halftone image is constituted by a pattern constituted by a group of parallel lines each extending in a second direction crossing the first direction.

15. The image forming apparatus according to claim 14, wherein line thickness and line pitch of the group of the parallel lines constituting the first halftone image are equal to line thickness and line pitch of the group of the parallel lines constituting the second halftone image.

16. The image forming apparatus according to claim 11, wherein the base image is an image formed at uniform density throughout a region including the first region and the second region.

17. The image forming apparatus according to claim 11, wherein the controller is configured to change a toner amount per unit area of the base image in accordance with the recording material such that, in a case where the image is formed on a first recording material and a second recording material having higher surface roughness than the first recording material, the toner amount per unit area of the base image formed on the second recording material is larger than the toner amount per unit area of the base image formed on the first recording material.

18. The image forming apparatus according to claim 11, wherein a color difference ΔE2000 of a CIE L*a*b* value between the image in the first region and the image in the second region is 3.0 or less.

19. The image forming apparatus according to claim 11, wherein, for at least one measurement angle, difference between a 75° specular glossiness of a region of the first halftone image measured by a gloss meter at the measurement angle and a 75° specular glossiness of a region of the second halftone image measured by the gloss meter at the measurement angle is 4° or more.

20. The image forming apparatus according to claim 11, wherein the first halftone image and the second halftone image are simultaneously formed by the image forming unit, and are simultaneously fixed by the fixing unit.

21. The image forming apparatus according to claim 11, wherein the image is a mark guaranteeing that the recording material on which the image is applied is an original.

22. The image forming apparatus according to claim 11, further comprising a re-conveyance portion configured to convey the recording material having passed the fixing unit again to the image forming unit, wherein the controller is configured to:

cause the image forming unit to form the base image on the recording material;

cause the fixing unit to fix the base image;

cause the re-conveyance portion to convey the recording material again to the image forming unit;

cause the image forming unit to form the surface image on the recording material; and cause the fixing unit to fix the surface image.

23. An image forming apparatus comprising:

an image forming unit configured to form a toner image on a recording material;

a fixing unit configured to fix the toner image formed on the recording material by the image forming unit to the recording material; and a controller configured to cause the image forming unit to form an image on a basis of image information, the controller being configured to cause the image forming unit to form the image in which a first toner image and a second toner image are superimposed on each other on the recording material, the first toner image being a toner image corresponding to the image information, the second toner image being formed from pigmented toner and constituted by a pattern having anisotropy such that glossiness of the image changes depending on a direction in which the image is viewed wherein, in the pattern constituting the second toner image, parallel lines extending in the same direction are arranged at a predetermined pitch, wherein the controller is configured to change a level of a decorative effect by changing thickness and pitch of the parallel lines constituting the second toner image, and wherein the thickness and the pitch of the parallel lines are the same value, and an upper limit of a total of the thickness and the pitch of the parallel lines is 0.84 mm.

* * * * *